United States Patent
Beamon et al.

(10) Patent No.: US 9,613,317 B2
(45) Date of Patent: Apr. 4, 2017

(54) JUSTIFYING PASSAGE MACHINE LEARNING FOR QUESTION AND ANSWER SYSTEMS

(71) Applicant: International Business Machines Corporation, Armonk, NY (US)

(72) Inventors: Bridget B. Beamon, Cedar Park, TX (US); Michael D. Whitley, Durham, NC (US); Robert L. Yates, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 14/228,830

(22) Filed: Mar. 28, 2014

(65) Prior Publication Data

US 2014/0297571 A1 Oct. 2, 2014

Related U.S. Application Data

(63) Continuation-in-part of application No. 13/853,261, filed on Mar. 29, 2013.

(51) Int. Cl.
*G06N 99/00* (2010.01)
(52) U.S. Cl.
CPC .................. *G06N 99/005* (2013.01)
(58) Field of Classification Search
None
See application file for complete search history.

(56) References Cited

U.S. PATENT DOCUMENTS 9,213,771 B2 * 12/2015 Chen .................. G06F 17/30867
2004/0153508 A1 * 8/2004 Alcorn .................... G06Q 30/06
709/205

(Continued)

FOREIGN PATENT DOCUMENTS

| CA | 2812338 A1 | 3/2012 |
|---|---|---|
| CN | 103221952 A | 7/2013 |

(Continued)

OTHER PUBLICATIONS

U.S. Appl. No. 13/853,261.

(Continued)

*Primary Examiner* — Maryam Ipakchi
(74) *Attorney, Agent, or Firm* — Stephen J. Walder, Jr.; Reza Sarbakhsh

(57) ABSTRACT

Mechanisms are provided for generating an answer to an input question. An input question is received and a set of candidate answers is generated along with, for each candidate answer in the set of candidate answers, a corresponding selection of one or more selected evidence portions from a corpus of information providing evidence in support of the candidate answer being a correct answer for the input question. The candidate answers are ranked based on an application of a justifying passage model (JPM) to the selected evidence portions for each of the candidate answers in the set of candidate answers. The JPM identifies whether a candidate answer is justified by a selected evidence passage corresponding to the candidate answer. A candidate answer is output as the correct answer for the input question based on the ranking of the candidate answers.

21 Claims, 19 Drawing Sheets

(56) References Cited

U.S. PATENT DOCUMENTS

| | | | |
|---|---|---|---|
| 2004/0153509 A1* | 8/2004 | Alcorn | G06Q 30/06 709/205 |
| 2006/0216683 A1 | 9/2006 | Goradia | |
| 2008/0183520 A1* | 7/2008 | Cutts | G06Q 10/06 705/7.36 |
| 2008/0195378 A1 | 8/2008 | Nakazawa et al. | |
| 2009/0241031 A1* | 9/2009 | Gamaley | G06Q 10/10 715/736 |
| 2009/0287678 A1* | 11/2009 | Brown | G06F 17/30654 |
| 2009/0292687 A1 | 11/2009 | Fan et al. | |
| 2010/0153151 A1* | 6/2010 | Toenjes | G06Q 10/10 705/7.41 |
| 2011/0066587 A1 | 3/2011 | Ferrucci et al. | |
| 2011/0125734 A1 | 5/2011 | Duboue et al. | |
| 2012/0077178 A1 | 3/2012 | Bagchi et al. | |
| 2012/0078837 A1* | 3/2012 | Bagchi | A61B 5/00 706/52 |
| 2012/0078889 A1 | 3/2012 | Chu-Carroll et al. | |
| 2012/0078890 A1 | 3/2012 | Fan et al. | |
| 2012/0084293 A1* | 4/2012 | Brown | A61B 5/00 707/741 |
| 2012/0323906 A1 | 12/2012 | Fan et al. | |
| 2013/0007055 A1 | 1/2013 | Brown et al. | |
| 2013/0018652 A1 | 1/2013 | Ferrucci et al. | |
| 2013/0018876 A1 | 1/2013 | Chu-Carroll et al. | |
| 2013/0066886 A1 | 3/2013 | Bagchi et al. | |
| 2013/0262501 A1 | 10/2013 | Kuchmann-Beauger et al. | |
| 2013/0268260 A1 | 10/2013 | Lundberg et al. | |

FOREIGN PATENT DOCUMENTS

| | | |
|---|---|---|
| CN | 103229120 A | 7/2013 |
| EP | 2616974 A1 | 7/2013 |
| EP | 2622428 A1 | 8/2013 |
| JP | 4924950 B2 | 4/2012 |
| WO | WO2006/085661 A1 | 8/2006 |
| WO | WO2012/040350 A1 | 3/2012 |
| WO | WO2012/047532 A1 | 4/2012 |

OTHER PUBLICATIONS

High, Rob, "The Era of Cognitive Systems: An Inside Look at IBM Watson and How it Works", IBM Corporation, Redbooks, 2012, 16 pages.

Lin, Jimmy et al., "The Role of Context in Question Answering Systems", CHI 2003, http://groups.csail.mit.edu/infolab/publications/Lin-etal-CHI03.pdf, Apr. 5-10, 2003, 2 pages.

Quarteroni, Silvia et al., "User Modelling for Adaptive Question Answering and Information Retrieval", American Association for Artificial Intelligence, http://www.aaai.org/Papers/FLAIRS/2006/Flairs06-153.pdf 2006, pp. 776-781.

Yuan, Michael J., "Watson and healthcare, How natural language processing and semantic search could revolutionize clinical decision support", IBM developerWorks, IBM Corporation, Apr. 12, 2011, 14 pages.

International Search Report and Written Opinion dated Apr. 1, 2014 for International Application No. PCT/IB2014/058498, 7 pages.

\* cited by examiner

QA System _700_

Who are Putin's Closest Advisors? (Ask?) _710_ _730_

Highlight possible answers in the passages below. The answers will be added to the list on the right and the QA system will search for evidence that supports the answer.

_734_ _732_

*Medvedev* became one of the politicians closest to President Putin, and during the 2000 Presidential elections he was Putin's campaign manager. Putin won the election with 52.94% of the popular vote.

Source C Link  _739_  738 [▮▮▮] [X] _736_

Viktor Ivanov is considered one of Putin's closest allies.

Evidence in Support of Vladimir Putin is Putin's closest advisor:

Evidence in Support of Russia is Putin's closest advisor:

These men mentored and shaped Putin and his closets friends and allies. It is therefore unsurprising that Putin's Russia has become an assassination-happy state where detection, interrogation, and torture – all tried and true methods of the Soviet KGB...

Source A Link   [▮▮▮] [X]

These men mentored and shaped Putin and his closets friends and allies. It is therefore unsurprising that Putin's Russia has become an assassination-happy state where detection, interrogation, and torture – all tried and true methods of the Soviet KGB...

Source B Link   [▮▮▮] [X]

_750_

Who are Putin's Closest Advisors? _720_ _724_

EXPLORE ANSWERS _726_

Select answer to see evidence _729_

Russia            [▮▮▮] [X]
Garry Kasparov    [▮▮▮] [X]
Vladimir Putin    [▮▮▮] [X]
Viktor Ivanov     [▮▮▮] [X]

_728_

(Add Answer)

*FIG. 7A*

QA System 700

Who are Putin's Closest Advisors? [Ask?] 710

730

Highlight possible answers in the passages below. The answers will be added to the list on the right and the QA system will search for evidence that supports the answer.

732

734

*Medvedev* became one of the politicians closest to President Putin, and during the 2000 Presidential elections he was Putin's campaign manager. Putin won the election with 52.94% of the popular vote.

Source C Link  739   738▬▬▭

736

Viktor Ivanov is considered one of Putin's closest allies.

Evidence in Support of Vladimir Putin in Putin's closest advisor:
Evidence in Support of Gary Kasparov in Putin's closest advisor:
Evidence in Support of Russia is Putin's closest advisor:

These men mentored and shaped Putin and his closets friends and allies. It is therefore unsurprising that Putin's Russia has become an assassination-happy state where detection, interrogation, and torture – all tried and true methods of the Soviet KGB...  ▬▭  [X]

Source A Link

Putin's Russia is dramatically different from the cold war Soviet Union. Whereas the Soviet government exercised tight control over the populace, in Putin's Russia, organized crime has increased dramatically.  ▬▭  [X]

Source E Link

---

Who are Putin's Closest Advisors? 722  720

724

EXPLORE ANSWERS  726

Select answer to see evidence  729

| Russia | ▬▬▬▭ | [X] |
| Garry Kasparov | ▬▭ | [X] |
| Vladimir Putin | ▬▭ | [X] |
| Viktor Ivanov | ▬▬▬▬▭ | [X] |

728

[ Add Answer ]

QA System 700

Who are Putin's Closest Advisors? [Ask?] 710 — 730

Highlight possible answers in the passages below. The answers will be added to the list on the right and the QA system will search for evidence that supports the answer.

Medvedev became one of the politicians closest to President Putin, and during the 2000 Presidential elections he was Putin's campaign manager. Putin won the election with 52.94% of the popular vote. — 732

Source C Link — 739    738 — ▮▮▯    736 — X

Viktor Ivanov is considered one of Putin's closest allies.

Evidence in Support of Vladimir Putin in Putin's closest advisor:

Evidence in Support of Garry Kasparov in Putin's closest advisor:

Evidence in Support of John Jones is Putin's closest advisor:

*No Evidence Found.*

— 760

---

EXPLORE ANSWERS 720 — 724

Who are Putin's Closest Advisors? — 722

Select answer to see evidence    726

| Russia | ▮▮▮▯ 729 | X |
| Garry Kasparov | ▮▮▯▯ | X |
| Vladimir Putin | ▮▮▯▯ | X |
| Viktor Ivanov | ▯▯▯▯ | X |

John Jones — 728

[Add Answer]

FIG. 7D

QA System  700

Who are Putin's Closest Advisors? [Ask?] 710    730

Highlight possible answers in the passages below. The answers will be added to the list on the right and the QA system will search for evidence that supports the answer.    770

Medvedev became one of the politicians closest to President Putin, and during the 2000 Presidential elections he was Putin's campaign manager. Putin won the election with 52.94% of the popular vote.

739    738 ▮▮▮ X    736

*Source 6 Link*

Source C:  Veracity Rating: High

While his opponents had been preparing for an election in June 2000, Yeltsin's resignation resulted in the Presidential elections being held within three months, on 26 March 2000; Putin won in the first round with 53% of the vote.[

*Medvedev became one of the politicians closest to President Putin, and during the 2000 Presidential elections he was Putin's campaign manager. Putin won the election with 52.94% of the popular vote.*

While from the early 2000s Russia started pumping more money into its military and defense industry, it was only in 2008 that the full-scale Russian military reform began, aimed to modernize Russian Armed Forces and made them significantly more effective. The reform was largely carried by Defense Minister Anatoly Serdyukov during Medvedev's Presidency, under supervision of both Putin, as the Head of Government, and Medvedev, as the Commander-in-Chief of the Russian Armed Forces.

780

720

Who are Putin's Closest Advisors?    722

724

EXPLORE ANSWERS

Select answer to see evidence    726

Russia            ▮▮▮▯ X    729
Garry Kasparov    ▮▮▮▯ X
Vladimir Putin    ▮▮▯▯ X
Viktor Ivanov     ▮▯▯▯ X

728

[Add Answer]

*FIG. 7E*

JUSTIFYING PASSAGE MACHINE LEARNING FOR QUESTION AND ANSWER SYSTEMS

RELATED APPLICATION

This application is a continuation-in-part of commonly assigned and co-pending U.S. patent application Ser. No. 13/853,261 filed on Mar. 29, 2013.

BACKGROUND

The present application relates generally to an improved data processing apparatus and method and more specifically to mechanisms for implementing a justifying passage machine learning mechanism in a question and answer system, such as the Watson™ question and answer system available from International Business Machines Corporation of Armonk, N.Y.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States patent application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system comprising a processor and a memory configured to implement a question and answer system (QA), for generating answers to an input question is provided. The method comprises receiving, in the data processing system, the input question and generating, by the data processing system, a set of candidate answers for the input question and, for each candidate answer in the set of candidate answers, a corresponding selection of one or more selected evidence portions from a corpus of information providing evidence in support of the candidate answer being a correct answer for the input question. The method further comprises ranking, by the data processing system, the candidate answers based on an application of a justifying passage model (JPM) to the selected evidence portions for each of the candidate answers in the set of candidate answers. The JPM identifies whether a candidate answer is justified by a selected evidence passage corresponding to the candidate answer. Moreover, the method comprises outputting, by the data processing system, a candidate answer in the set of candidate answers as the correct answer for the input question based on the ranking of the candidate answers.

In another illustrative embodiment, a method, in a data processing system comprising a processor and a memory configured to implement a question and answer system (QA), for generating answers to an input question is again provided. This method comprises receiving, in the data processing system, the input question and generating, by the data processing system, a set of candidate answers for the input question and, for each candidate answer in the set of candidate answers, a corresponding selection of one or more selected evidence portions from a corpus of information providing evidence in support of the candidate answer being a correct answer for the input question. In addition, the method comprises, for each candidate answer in the set of candidate answers: applying a justifying passage model (JPM) to selected evidence portions associated with the candidate answer to generate an evidence score for each selected evidence portion, wherein the JPM identifies whether a candidate answer is justified by a selected evidence passage corresponding to the candidate answer; selecting a subset of the selected evidence portions for use in ranking the candidate answers, based on one or more filter criteria; and ranking the candidate answer relative to other candidate answers in the set of candidate answers based on the selected subset of the ranked evidence portions. The method further comprises outputting, by the data processing system, a candidate answer in the set of candidate answers as the correct answer for the input question based on the ranking of the candidate answers.

In other illustrative embodiments, a computer program product comprising a computer useable or readable medium having a computer readable program is provided. The computer readable program, when executed on a computing device, causes the computing device to perform various ones of, and combinations of, the operations outlined above with regard to one or more of the method illustrative embodiments.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to one or more of the method illustrative embodiments.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 7A-7E are example diagrams illustrating graphical user interfaces and the operation of such graphical user interfaces in accordance with one illustrative embodiment;

DETAILED DESCRIPTION

Figure 1:
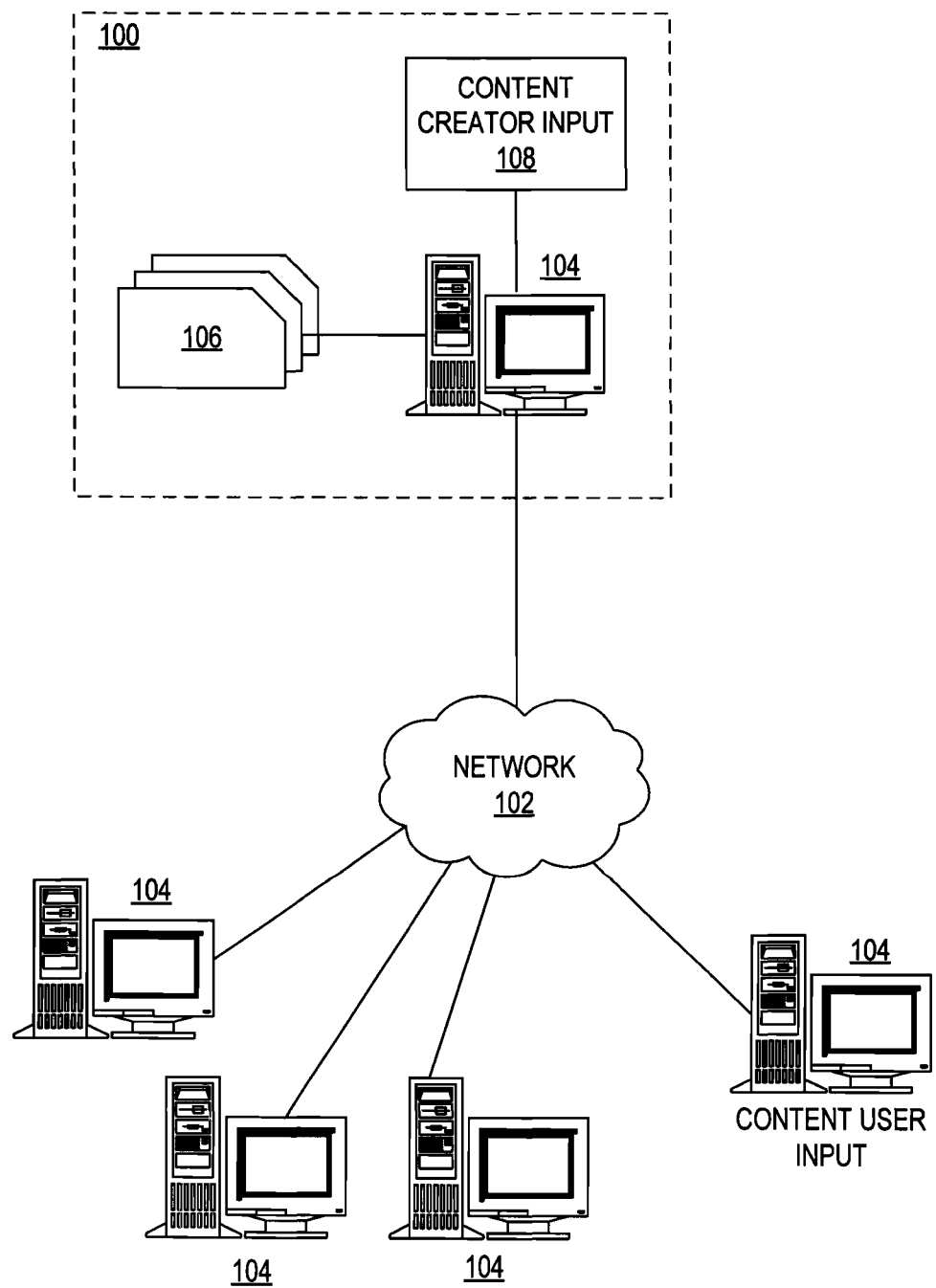
FIG. 1 depicts a schematic diagram of one illustrative embodiment of a question/answer (QA) system in a computer network.

The illustrative embodiments provide mechanisms for improving the operation of a Question Answering (QA) system by providing a user interface and supporting logic that provides functionality for a user to review, evaluate, and modify the candidate answers generated by the QA system, the evidence in support of the candidate answers, and provide selections/input identifying other possible candidate answers and automatically obtain evidence in support of these other possible candidate answers in response to the user's input/selections. That is, a user may input a question to the QA system which will perform its operations of parsing the input question, generating one or more queries based on the input question, applying the one or more queries to the corpus of information to identify candidate answers, and generate an output of the candidate answers. The candidate answers may be output with an indication of the corresponding confidence scores generated by the QA system and may be ranked according to confidence scores generated by the QA system, thereby generating a ranked listing of candidate answers that may be reviewed by the user. The output of the candidate answers may include a GUI element in association with the candidate answers for allowing a user to eliminate a candidate answer from the listing of candidate answers should the user subjectively determine that the candidate answer is not a valid answer for the input question.

In addition, with the mechanisms of the illustrative embodiments, the QA system stores information regarding the portions of the corpus of information used in support of the candidate answer being a correct answer for the input question, and in some illustrative embodiments, evidence that detracts from the candidate answer being a correct answer. These portions of the corpus of information, referred to hereafter as "evidence passages," may be output in correlation with the candidate answers to which they apply for review and evaluation by the user via a graphical user interface (GUI). These evidence passages may have relevance scores associated with them indicating a degree to which the evidence passage is believed to be relevant to the input question, as may be determined by the QA system through an analysis of the context of the evidence passage. These matching scores may be used to rank the output of the evidence passages in the GUI and provide an indicator to the user of the relative importance of the evidence passage to the consideration of the candidate answer as a correct answer for the input question.

Portions of the evidence passages are selectable in the GUI for automatically generating additional candidate answers and generating a new set of evidence passages associated with the additional candidate answers. For example, a sub-portion of text in an evidence passage may be selectable by a user, such as by using a pointing device to select the text in a manner generally known in the art, in which case the selected sub-portion of text may be used to automatically generate another candidate answer in the ranked listing of candidate answers. The new candidate answer may be similarly evaluated based on queries applied to the corpus of information and the ranked listing of candidate answers may be adjusted accordingly based on the determined confidence score of the new candidate answer. The evidence passages associated with the new candidate answer may likewise be stored in association with the candidate answer and used to automatically update the output of the evidence passages in the GUI for review by the user.

Moreover, GUI elements are provided for selection of evidence passages to be removed from the set of evidence passages associated with a candidate answer or increasing a relevance score associated with the evidence passage. That is, GUI elements are provided that allow a user to override the determined relevance of the evidence passage to the corresponding candidate answer by either eliminating the evidence passage altogether or modifying its relevance score based on the user's subjective determination of the relevance of the evidence passage, either for or against the candidate answer being a correct answer for the input question. Changes made to the set of evidence passages stored for the candidate answer may be automatically used to update the confidence score associated with the candidate answer and modify the ranked listing of candidate answers in the GUI.

GUI elements may also be provided for allowing a user to input a new candidate answer directly into the GUI in a free-form manner without having to select the candidate answer from an evidence passage. The new free-form candidate answer may be likewise evaluated against the corpus of information, used to update the ranked listing of candidate answers based on the new free-form candidate answer's calculated confidence score, and have the new free-form candidate answer's evidence passages added to the portion of the GUI in which the evidence passages are output in association with the new free-form candidate answer.

The changes made, via the GUI, to the ranked listing of candidate answers and sets of evidence passages associated with the candidate answers, may be stored for later retrieval and use. Such information may be used to assist in training of the QA system, such as by adjusting scoring parameters, adjusting weights associated with documents or sources of content in the corpus of content, and other operational parameters of the QA system. During runtime, the stored set of candidate answers and corresponding evidence passages may be used to assist in responding to the same or similar answers being submitted by the same or other users at a later time. For example, when an input question is received and parsed to generate one or more queries, the stored information may be searched to find entries having similar queries to that of the input question so that corresponding candidate answers and supporting evidence passages may be quickly retrieved and used to generate an answer or set of candidate answers for the input question. Moreover, the stored set of candidate answers and corresponding evidence passages may be used by an analyst to compare to subsequent executions on a same or similar question to evaluate if and how the corpus of information has been modified since the stored set of candidate answers and corresponding evidence passages was generated. There are a plethora of potential uses of the results generated by the operation of the illustrative embodiments, any of which are intended to be within the spirit and scope of the illustrative embodiments.

Thus, the illustrative embodiments provide mechanisms for assisting users in collaborating with a QA system during the generation of candidate answers for an input question. The illustrative embodiments allow a user to fine tune the generation of candidate answers by providing mechanisms through which the user may review and evaluate the evidence passages associated with candidate answers, use these evidence passages to generate other candidate answers, input additional candidate answers in a free-form manner, modify which candidate answers are to remain in the set of candidate answers, and modify the sets of evidence passages associated with candidate answers to adjust their relevance scores or even inclusion in the set of evidence passages for a candidate answer.

In addition to the above aspects, the illustrative embodiments provide mechanism for utilizing a trained statistical machine learning model, referred to herein as the justifying passage model, so as to provide probabilities, during runtime, that a particular evidence passage will or will not be justifying of the question and the candidate answer. Moreover, in one illustrative embodiment, this justifying passage model may be used to filter evidence passages when considering the evidence passages for purposes of candidate answer generation. In another illustrative embodiment, the justifying passage model may be used during final scoring and ranking of candidate answers to thereby modify the confidence scores based on whether the evidence passages are justifying of the corresponding candidate answer. In yet another illustrative embodiment, the justifying passage model may be used to perform supporting passage retrieval during candidate answer generation in a parallel operation with context dependent scoring.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
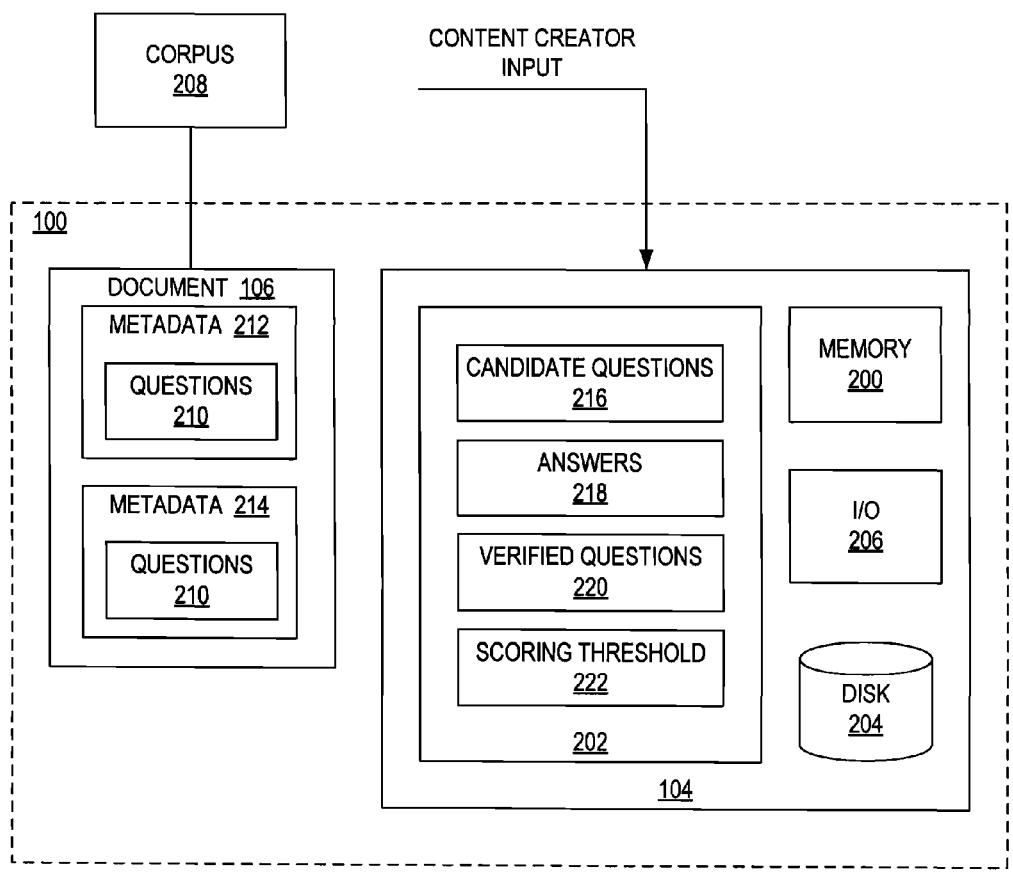
FIG. 2 depicts a schematic diagram of one embodiment of the QA system of FIG. 1.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIGS. 1-4 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to providing interfaces and functionality for allowing a user to collaborate with the QA system when generating candidate answers for an input question. Thus, it is important to first have an understanding of how question and answer creation may be implemented before describing how the mechanisms of the illustrative embodiments are integrated in and augment such question/answer (QA) systems. It should be appreciated that the QA mechanisms described in FIGS. 1-4 are only examples and are not intended to state or imply any limitation with regard to the type of QA mechanisms with which the illustrative embodiments may be implemented. Many modifications to the example QA system shown in FIGS. 1-4 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers. However, with particular relevance to the illustrative embodiments described herein, conventional question answering (QA) systems do not provide any mechanisms by which a user is presented with the candidate answers, the evidence passages in support of, or detracting from, the candidate answer being a correct answer for the input question, and provided with a graphical user interface (GUI) through which the user may collaborate with the QA system to modify the candidate answers and/or its corresponding evidence passages.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more content users. Other embodiments of the QA system 100 may be used with components, systems, sub-systems, and/or devices other than those that are depicted herein.

The QA system 100 may be configured to receive inputs from various sources. For example, the QA system 100 may receive input from the network 102, a corpus of electronic documents 106 or other data, a content creator 108, content users, and other possible sources of input. In one embodiment, some or all of the inputs to the QA system 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that the QA system 100 may operate in environments of any size, including local and global, e.g., the Internet.

In one embodiment, the content creator creates content in a document 106 for use as part of a corpus of data with the QA system 100. The document 106 may include any file, text, article, or source of data for use in the QA system 100. Content users may access the QA system 100 via a network connection or an Internet connection to the network 102, and may input questions to the QA system 100 that may be answered by the content in the corpus of data. In one embodiment, the questions may be formed using natural language. The QA system 100 may interpret the question and provide a response to the content user containing one or more answers to the question. In some embodiments, the QA system 100 may provide a response to users in a ranked list of answers.

In some illustrative embodiments, the QA system 100 may be the Watson™ QA system available from International Business Machines Corporation of Armonk, N.Y., which is augmented with the mechanisms described hereafter for facilitating user collaboration with the QA system 100 during candidate answer generation and evaluation. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generate by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may loot at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Figure 4:
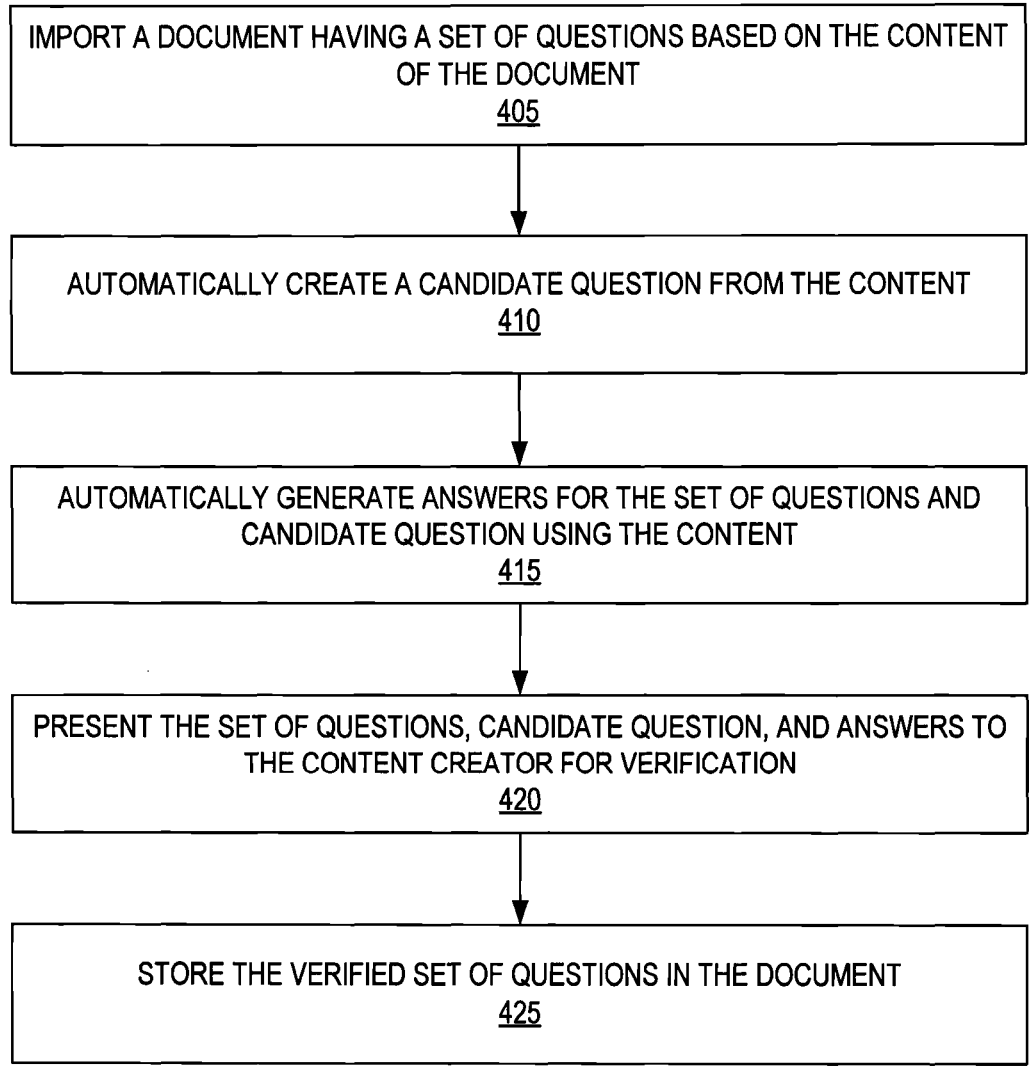
FIG. 4 depicts a flowchart diagram of one embodiment of a method for question/answer creation for a document.

FIG. 2 depicts a schematic diagram of one embodiment of the QA system 100 of FIG. 1. The depicted QA system 100 includes various components, described in more detail below, that are capable of performing the functions and operations described herein. In one embodiment, at least some of the components of the QA system 100 are implemented in a computer system. For example, the functionality of one or more components of the QA system 100 may be implemented by computer program instructions stored on a computer memory device 200 and executed by a processing device, such as a CPU. The QA system 100 may include other components, such as a disk storage drive 204, and input/output devices 206, and at least one document 106 from a corpus 208. Some or all of the components of the QA system 100 may be stored on a single computing device 104 or on a network of computing devices 104, including a wireless communication network. The QA system 100 may include more or fewer components or subsystems than those depicted herein. In some embodiments, the QA system 100 may be used to implement the methods described herein as depicted in FIG. 4 and may be augmented or configured to implement the additional operations, functionality, and features described hereafter with regard to improving the results generated by an QA system 100 by facilitating user collaboration with the QA system 100 during candidate answer generation and evaluation.

In one embodiment, the QA system 100 includes at least one computing device 104 with a processor 202 for performing the operations described herein in conjunction with the QA system 100. The processor 202 may include a single processing device or multiple processing devices. The processor 202 may have multiple processing devices in different computing devices 104 over a network such that the operations described herein may be performed by one or more computing devices 104. The processor 202 is connected to and in communication with the memory device. In some embodiments, the processor 202 may store and access data on the memory device 200 for performing the operations described herein. The processor 202 may also be connected to a storage disk 204, which may be used for data storage, for example, for storing data from the memory device 200, data used in the operations performed by the processor 202, and software for performing the operations described herein.

In one embodiment, the QA system 100 imports a document 106. The electronic document 106 may be part of a larger corpus 208 of data or content, which may contain electronic documents 106 related to a specific topic or a variety of topics. The corpus 208 of data may include any number of documents 106 and may be stored in any location relative to the QA system 100. The QA system 100 may be capable of importing any of the documents 106 in the corpus 208 of data for processing by the processor 202. The processor 202 may communicate with the memory device 200 to store data while the corpus 208 is being processed.

The document 106 may include a set of questions 210 generated by the content creator at the time the content was created. When the content creator creates the content in the document 106, the content creator may determine one or more questions that may be answered by the content or for specific use cases for the content. The content may be created with the intent to answer specific questions. These questions may be inserted into the content, for example, by inserting the set of questions 210 into the viewable content/text 214 or in metadata 212 associated with the document 106. In some embodiments, the set of questions 210 shown in the viewable text 214 may be displayed in a list in the document 106 so that the content users may easily see specific questions answered by the document 106.

The set of questions 210 created by the content creator at the time the content is created may be detected by the processor 202. The processor 202 may further create one or more candidate questions 216 from the content in the document 106. The candidate questions 216 include questions that are answered by the document 106, but that may not have been entered or contemplated by the content creator. The processor 202 may also attempt to answer the set of questions 210 created by the content creator and candidate questions 216 extracted from the document 106, "extracted" meaning questions that are not explicitly specified by the content creator but are generated based on analysis of the content.

In one embodiment, the processor 202 determines that one or more of the questions are answered by the content of the document 106 and lists or otherwise marks the questions that were answered in the document 106. The QA system 100 may also attempt to provide answers 218 for the candidate questions 216. In one embodiment, the QA system 100 answers 218 the set of questions 210 created by the content creator before creating the candidate questions 216. In another embodiment, the QA system 100 answers 218 the questions and the candidate questions 216 at the same time.

The QA system 100 may score question/answer pairs generated by the system. In such an embodiment, question/answer pairs that meet a scoring threshold are retained, and question/answer pairs that do not meet the scoring threshold 222 are discarded. In one embodiment, the QA system 100 scores the questions and answers separately, such that questions generated by the system 100 that are retained meet a question scoring threshold, and answers found by the system 100 that are retained meet an answer scoring threshold. In another embodiment, each question/answer pair is scored according to a question/answer scoring threshold.

After creating the candidate questions 216, the QA system 100 may present the questions and candidate questions 216 to the content creator for manual user verification. The content creator may verify the questions and candidate questions 216 for accuracy and relatedness to the content of the document 106. The content creator may also verify that the candidate questions 216 are worded properly and are easy to understand. If the questions contain inaccuracies or are not worded properly, the content creator may revise the content accordingly. The questions and candidate questions 216 that have been verified or revised may then be stored in the content of the document 106 as verified questions, either in the viewable text 214 or in the metadata 212 or both.

Figure 3:
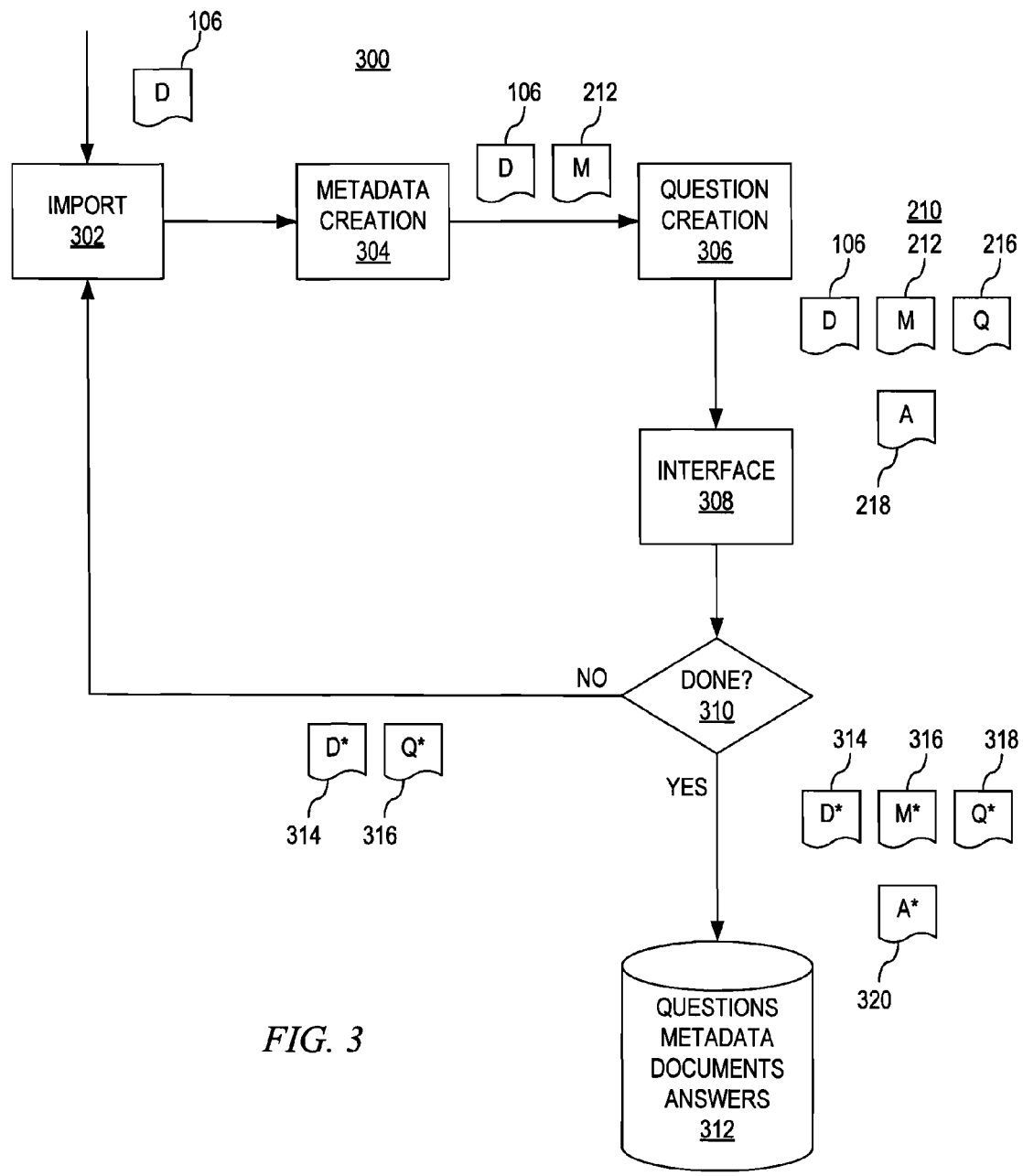
FIG. 3 depicts a flowchart diagram of one embodiment of a method for question/answer creation for a document.

FIG. 3 depicts a flowchart diagram of one embodiment of a method 300 for question/answer creation for a document 106. Although the method 300 is described in conjunction with the QA system 100 of FIG. 1, the method 300 may be used in conjunction with any type of QA system.

In one embodiment, the QA system 100 imports 302 one or more electronic documents 106 from a corpus 208 of data. This may include retrieving the documents 106 from an external source, such as a storage device in a local or remote computing device 104. The documents 106 may be processed so that the QA system 100 is able to interpret the content of each document 106. This may include parsing the content of the documents 106 to identify questions found in the documents 106 and other elements of the content, such as in the metadata associated with the documents 106, questions listed in the content of the documents 106, or the like. The system 100 may parse documents using document markup to identify questions. For example, if documents are in extensible markup language (XML) format, portions of the documents could have XML question tags. In such an embodiment, an XML parser may be used to find appropriate document parts. In another embodiment, the documents are parsed using native language processing (NLP) techniques to find questions. For example, the NLP techniques may include finding sentence boundaries and looking at sentences that end with a question mark or other methods. The QA system 100 may use language processing techniques to parse the documents 106 into sentences and phrases, for example.

In one embodiment, the content creator creates 304 metadata 212 for a document 106, which may contain information related to the document 106, such as file information, search tags, questions created by the content creator, and other information. In some embodiments, metadata 212 may already be stored in the document 106, and the metadata 212 may be modified according to the operations performed by the QA system 100. Because the metadata 212 is stored with the document content, the questions created by the content creator may be searchable via a search engine configured to perform searches on the corpus 208 of data, even though the metadata 212 may not be visible when the document 106 is opened by a content user. Thus, the metadata 212 may include any number of questions that are answered by the content without cluttering the document 106.

The content creator may create 306 more questions based on the content, if applicable. The QA system 100 also generates candidate questions 216 based on the content that may not have been entered by the content creator. The candidate questions 216 may be created using language processing techniques designed to interpret the content of the document 106 and generate the candidate questions 216 so that the candidate questions 216 may be formed using natural language.

When the QA system 100 creates the candidate questions 216 or when the content creator enters questions into the document 106, the QA system 100 may also locate the questions in the content and answer the questions using language processing techniques. In one embodiment, this process includes listing the questions and candidate questions 216 for which the QA system 100 is able to locate answers 218 in the metadata 212. The QA system 100 may also check the corpus 208 of data or another corpus 208 for comparing the questions and candidate questions 216 to other content, which may allow the QA system 100 to determine better ways to form the questions or answers 218. Examples of providing answers to questions from a corpus are described in U.S. Patent Application Publication No. 2009/0287678 and U.S. Patent Application Publication No. 2009/0292687, which are herein incorporated by reference in their entirety.

The questions, candidate questions 216, and answers 218 may then be presented 308 on an interface to the content creator for verification. In some embodiments, the document text and metadata 212 may also be presented for verification. The interface may be configured to receive a manual input from the content creator for user verification of the questions, candidate questions 216, and answers 218. For example, the content creator may look at the list of questions and answers 218 placed in the metadata 212 by the QA system 100 to verify that the questions are paired with the appropriate answers 218, and that the question-answer pairs are found in the content of the document 106. The content creator may also verify that the list of candidate questions 216 and answers 218 placed in the metadata 212 by the QA system 100 are correctly paired, and that the candidate question-answer pairs are found in the content of the document 106. The content creator may also analyze the questions or candidate questions 216 to verify correct punctuation, grammar, terminology, and other characteristics to improve the questions or candidate questions 216 for searching and/or viewing by the content users. In one embodiment, the content creator may revise poorly worded or inaccurate questions and candidate questions 216 or content by adding terms, adding explicit questions or question templates that the content answers 218, adding explicit questions or question templates that the content does not answer, or other revisions. Question templates may be useful in allowing the content creator to create questions for various topics using the same basic format, which may allow for uniformity among the different content. Adding questions that the content does not answer to the document 106 may improve the search accuracy of the QA system 100 by eliminating content from the search results that is not applicable to a specific search.

After the content creator has revised the content, questions, candidate questions 216, and answers 218, the QA system 100 may determine 310 if the content finished being processed. If the QA system 100 determines that the content is finished being processed, the QA system 100 may then store 312 the verified document 314, verified questions 316, verified metadata 318, and verified answers 320 in a data store on which the corpus 208 of data is stored. If the QA system 100 determines that the content is not finished being processed—for example if the QA system 100 determines that additional questions may be used—the QA system 100 may perform some or all of the steps again. In one embodiment, the QA system 100 uses the verified document and/or the verified questions to create new metadata 212. Thus, the content creator or QA system 100 may create additional questions or candidate questions 216, respectively. In one embodiment, the QA system 100 is configured to receive feedback from content users. When the QA system 100 receives feedback from content users, the QA system 100 may report the feedback to the content creator, and the content creator may generate new questions or revise the current questions based on the feedback.

FIG. 4 depicts a flowchart diagram of one embodiment of a method 400 for question/answer creation for a document 106. Although the method 400 is described in conjunction with the QA system 100 of FIG. 1, the method 400 may be used in conjunction with any QA system.

The QA system 100 imports 405 a document 106 having a set of questions 210 based on the content of the document 106. The content may be any content, for example content directed to answering questions about a particular topic or a range of topics. In one embodiment, the content creator lists and categorizes the set of questions 210 at the top of the content or in some other location of the document 106. The categorization may be based on the content of the questions, the style of the questions, or any other categorization technique and may categorize the content based on various established categories such as the role, type of information, tasks described, and the like. The set of questions 210 may be obtained by scanning the viewable content 214 of the document 106 or metadata 212 associated with the document 106. The set of questions 210 may be created by the content creator when the content is created. In one embodiment, the QA system 100 automatically creates 410 at least one suggested or candidate question 216 based on the content in the document 106. The candidate question 216 may be a question that the content creator did not contemplate. The candidate question 216 may be created by processing the content using language processing techniques to parse and interpret the content. The system 100 may detect a pattern in the content of the document 106 that is common for other content in the corpus 208 to which the document 106 belongs, and may create the candidate question 216 based on the pattern.

The QA system 100 also automatically generates 415 answers 218 for the set of questions 210 and the candidate question 216 using the content in the document 106. The QA system 100 may generate the answers 218 for the set of questions 210 and the candidate question 216 at any time after creating the questions and candidate question 216. In some embodiments, the answers 218 for the set of questions 210 may be generated during a different operation than the answer for the candidate question 216. In other embodiments, the answers 218 for both the set of questions 210 and the candidate question 216 may be generated in the same operation.

The QA system 100 then presents 420 the set of questions 210, the candidate question 216, and the answers 218 for the set of questions 210 and the candidate question 216 to the content creator for user verification of accuracy. In one embodiment, the content creator also verifies the questions and candidate questions 216 for applicability to the content of the document 106. The content creator may verify that the content actually contains the information contained in the questions, candidate question 216, and respective answers 218. The content creator may also verify that the answers 218 for the corresponding questions and candidate question 216 contain accurate information. The content creator may also verify that any data in the document 106 or generated by the QA system 100 in conjunction with the QA system 100 is worded properly.

A verified set of questions 220 may then be stored 425 in the document 106. The verified set of questions 220 may include at least one verified question from the set of questions 210 and the candidate question 216. The QA system 100 populates the verified set of questions 220 with questions from the set of questions 210 and candidate questions 216 that are determined by the content creator to be accurate. In one embodiment, any of the questions, candidate questions 216, answers 218, and content that is verified by the content creator is stored in the document 106, for example, in a data store of a database.

The above description illustrates the manner by which content creators may generate metadata for use by a QA system 100 when performing answer generation for input questions. As discussed above, the QA system 100 also is used to answer input questions submitted by users via one or more client computing devices. For example, in a healthcare domain, the QA system 100 may be utilized to receive questions directed to medical issues, such as diagnosis, treatment, and the like. The QA system 100 may process such input questions through a QA system analysis pipeline to evaluate the input question against a corpus of data/information, which may include documents or content having associated metadata as previously described above, unstructured documents, or the like, and generate one or more potential answers to the input question.

Figure 5:
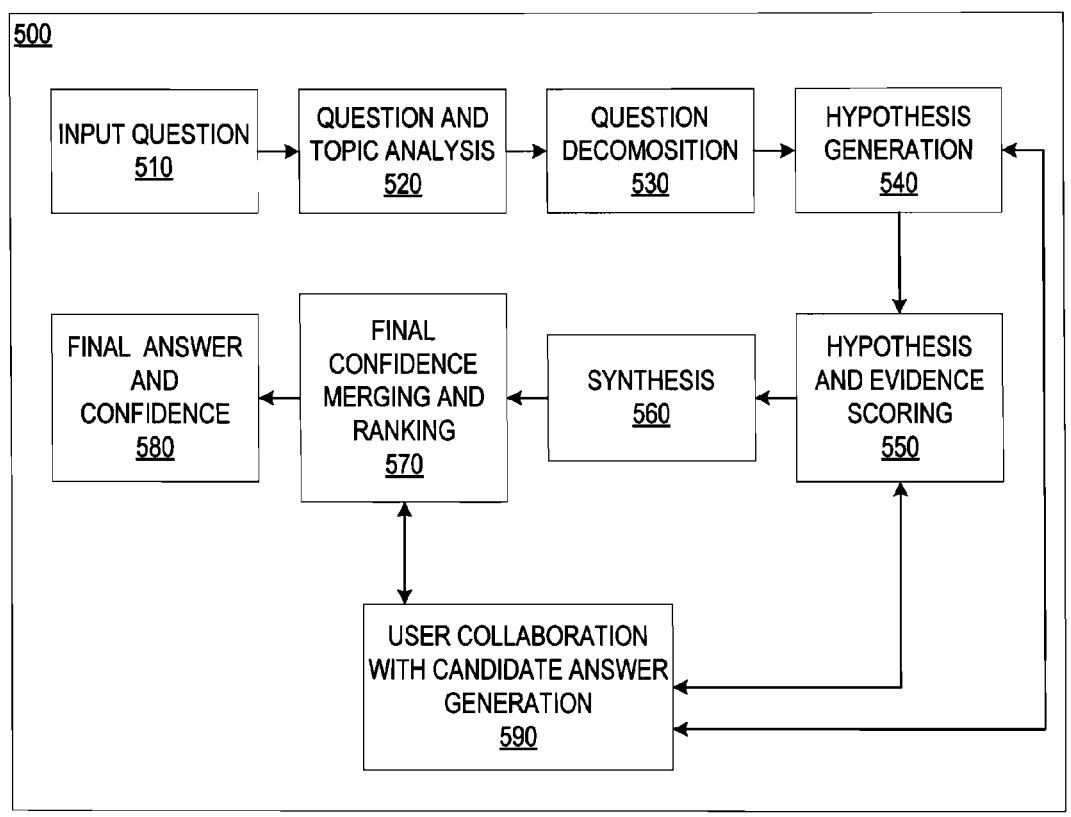
FIG. 5 is an example block diagram of a question and answer system analysis pipeline in accordance with one illustrative embodiment.

FIG. 5 illustrates a QA system pipeline for processing an input question in accordance with one illustrative embodiment. It should be appreciated that the stages of the QA system pipeline shown in FIG. 5 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems.

As shown in FIG. 5, the QA system pipeline 500 comprises a plurality of stages 510-580 through which the QA system operates to analyze an input question and generate a final response. In an initial question input stage 510, the QA system receives an input question that is presented in a natural language format. That is, a user may input, via a user interface, an input question for which the user wishes to obtain an answer, e.g., "Who are Putin's closest advisors?" In response to receiving the input question, the next stage of the QA system pipeline 500, i.e. the question and topic analysis stage 520, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Putin" may be identified as a proper name of a person with which the question is associated, "closest" may be identified as a word indicative of proximity or relationship, and "advisors" may be indicative of a noun or other language topic.

The identified major features may then be used during the question decomposition stage 530 to decompose the question into one or more queries that may be applied to the corpus of data/information in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpus of data/information. The queries being applied to the corpus of data/information generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 540, to generate hypotheses for answering the input question. These hypotheses are also referred to herein as "candidate answers" for the input question. For any input question, at this stage 540, there may be hundreds of hypotheses or candidate answers generated that may need to be evaluated.

The QA system pipeline 500, in stage 550, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

The generation of the relevance scores associated with the individual portions of the corpus of data/information may take many different forms. In one illustrative embodiment, when the QA system pipeline 500 performs analysis, such as described above with regard to stages 510-540, the QA system essentially generates question (Q)-answer (A)-passage (P) triplets which are stored. During a training process, these Q-A-P triplets may be generated based on training questions and a training corpus and may then be evaluated by Subject Matter Experts (SME), i.e. human analysts, which may generate a ground truth data structure for the Q-A-P triplet indicating whether the evidence passage is justifying of or not-justifying of the candidate answer given the input question. This ground truth data structure may be used to configure or train a statistical machine learning model which provides information indicating a justifying/not-justifying evaluation for the Q-A-P triplet, i.e. information indicating whether the passage (P) is justifying or not-justifying, and/or a degree of justifying/not-justifying, of the answer (A) being a correct answer for the question (Q). This information may be used to generate a score indicative of the relevance of a particular evidence passage to the candidate answer being a correct answer for an input question based on probabilities generated by the statistical machine learning model for features extracted from the input question and the evidence passage. Thus, the Q-A-P triplets may be identified and processed during training and scored based on various degrees of textual/semantic similarities and identified by the various reasoning algorithms. The resulting extracted features associated with the Q-A-P triplets, and the corresponding scores, SME indications of justifying/not-justifying nature of the evidence passage in the ground truth data structure, and the like, are stored and used to train the statistical machine learning model, referred to as a justifying passage model (JPM), so as to provide probabilities, during runtime, that a particular evidence passage will or will not be justifying of the question and candidate answer.

It should be appreciated that the concept of "justifying" of a candidate answer is intended to mean that the evidence passage itself, outside of the context of the input question, supports an assertion that the candidate answer is the answer for the particular question. That is, the evidence passage itself states that the candidate answer is an answer for the input question. For example, an evidence passage may have a statement that "George Washington helped form the United States of America." This statement in an evidence passage may be sufficient to support a candidate answer of "George Washington" being a correct answer for the input question "Who was the first President of the United States?" but it is not justifying of the candidate answer because the evidence passage itself does not provide any statement that "George Washington was the first President of the United States." An evidence passage that has a statement "The first President, George Washington." or "Washington, the first President of the United States . . . " or "George Washington was the first President of America . . . " are all justifying of the candidate answer however, since the answer to the question "Who was the first President of the United States?" is explicitly stated in these evidence passages. Whether or not a particular evidence passage is justifying of a particular question-answer pair can be determined by SMEs during training and the resulting ground truth data structure can be applied against similar extracted features for other similar input questions directed to a similar domain during runtime.

During normal runtime operation of the QA system, as part of the hypothesis generation stage 540 and the deep analysis performed during the stage 550, portions of the corpus, i.e. evidence passages, are collected and stored as evidence in support of (justifying) or in non-support of (non-justifying) a particular hypothesis (or answer) being correct for the input question (Q). After candidate answer list generation is performed, as described hereafter, the evidence passages themselves may be scored based on the justifying passage model and then ranked. The resulting ranked list of evidence passages may be output in an evidence passage portion of a graphical user interface, as further described hereafter. The ranked listings may be associated with the particular candidate answers for which they are justifying/non-justifying, however at the system level, the ranked listing and the candidate answers may become uncoupled, and each listing may have evidence passages ranked relative to other evidence passages within the same ranked listing. Moreover, entries in the output of the ranked list of evidence passages may have graphical user interface elements indicating a score associated with the particular evidence passage, referred to herein as a relevance score. The generation of relevance scores for evidence passages is further described hereafter with reference to FIG. 12.

In one illustrative embodiment, the relevance score for a particular portion of the corpus of data/information, or evidence passage, may be combined with relevance scores for other portions of the corpus of data/information to generate a confidence score as a whole for the hypothesis such that the confidence score is a function of the relevance scores contributing to the evaluation of the particular hypothesis. At this stage 550, there may be thousands of pieces of evidence, e.g., portions of the corpus of data/information, that are evaluated and hundreds of thousands of scores generated by the many different reasoning algorithms utilized.

In the synthesis stage 560, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 570 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 580, a final answer and confidence score, or final set of candidate answers and confidence scores, may be generated and output to the submitter of the original input question.

As shown in FIG. 5, in accordance the illustrative embodiments, after stage 580, or as part of stage 580, the set of candidate answers is output via a graphical user interface generated using the mechanisms of the illustrative embodiment, which provide the user with the tools for collaborating with the QA system to review, evaluate, and modify the listing of candidate answers and the evidence associated with these candidate answers that is evaluated by the QA system. That is, as shown in FIG. 5, at stage 590, the graphical user interface engine of the illustrative embodiments not only receives the final ranked listing of candidate answers generated by the QA system pipeline 500, but also receives the underlying evidence information for each of the candidate answers from the hypothesis and evidence scoring stage 550, and uses this information to generate a graphical user interface outputting the ranked listing of candidate answers and an output of the selected portions of the corpus of data/information that supports, and/or detracts, from the candidate answers being the correct answer for the input question, referred to hereafter as the "evidence passages."

The graphical user interface (GUI) that is generated comprises logic for receiving user inputs selecting subportions of the evidence passages, e.g., words, phrases, sentences, and the like, for use in generating additional candidate answers. That is, via the GUI, the user may select a portion of the evidence passage to generate a new candidate answer and the GUI may feed that information back into the QA system pipeline 500, such as at stage 540 or 550, for use in evaluating the new candidate answer via the hypothesis and evidence scoring stage 550 using the various reasoning algorithms and generating relevance scores which may then be used to generate a confidence score for the newly generated candidate answer. As a result, the GUI may be updated to include the newly generated candidate answer in the portion of the GUI that outputs the ranked listing of candidate answers, assuming that the confidence score for the newly generated candidate answer meets threshold requirements for depiction as a probable answer to the input question, e.g., a minimum confidence score, or may always output user generated candidate answers despite the candidate answer not meeting such threshold requirements. Similarly, the portion of the GUI that outputs the underlying evidence passages associated with candidate answers may be automatically updated to include entries for the newly generated candidate answer and its associated evidence passages.

Moreover, the GUI may include GUI elements for invoking logic and functionality of the GUI for removing evidence passages from the listing of associated evidence passages for the various candidate answers and/or modifying a relevance score associated with the evidence passage. In this way, the user essentially supersedes the evaluation made by the QA system pipeline 500 and instead imposes the user's subjective determination as to the relevance of an evidence passage by either eliminating it altogether or increasing/reducing the relevance score associated with the evidence passage to indicate the user's own subjective evaluation of the evidence passage's relevance to the candidate answer being the correct answer for the input question.

In addition, the GUI may include GUI elements for allowing a user to "drill down" within each evidence passage to obtain additional information about source of the evidence passage. This drill down logic allows a user to select a link in the evidence passage output that results in the user being presented with information regarding the source of the evidence passage, the context in which the evidence passage is present within the source document, and the like. Thus, for example, if the user wishes to drill down to the source document to perform a more detailed analysis of the surrounding context of the evidence passage to determine if the evidence passage is relevant to the candidate answer, or if other information may be gleaned from the context surrounding the evidence passage, then the drill down logic of the GUI may be used to achieve this. Just as with the evidence passage itself, the user may, via the GUI, select portions of the surrounding context or the source document for automatic generation of a new candidate answer, with the selected portion potentially being a portion that does not actually appear in the evidence passage, e.g., a name of a person present in the surrounding context but only generally referenced in the evidence passage with the name not appearing in the evidence passage. Other information that may be pertinent to the user's evaluation of the evidence passage may also be accessible via the drill-down logic including information regarding the reliability of the source document as a whole and other information for evaluating the veracity and reliability of the evidence passage.

Should the user eliminate the evidence passage or modify the evidence passage's relevance score in some manner, the QA system pipeline 500 may automatically adjust the relevance scores, confidence scores, and ranked listing of candidate answers based on the change to the evidence passage. In this way, the QA system pipeline 500 may dynamically adjust its output based on user collaboration with the QA system to provide the user's subject determination of the relevance, reliability, and correctness of the evidence passages and/or the candidate answers themselves.

With regard to the candidate answers themselves, the GUI may further provide GUI elements for eliminating candidate answers from the ranked listing of candidate answers and for providing free-form entry of new candidate answers. The GUI elements for eliminating the candidate answers, if selected, may remove the candidate answer from the ranked listing of candidate answers and may automatically result in the corresponding entries in the evidence passage portion of the GUI being removed. In this way, the candidate answer is completely removed as a candidate answer for the input question.

With regard to the free-form entry of new candidate answers, a text entry field, or the like, may be provided into which a user may type a candidate answer via a keyboard, enter via a speech-to-text mechanism, or any other way in which a user may enter a textual word, phrase, sentence, or the like. The newly entered candidate answer may be automatically added to the ranked listing of candidate answers and fed into the QA system pipeline 500, such as at stage 540 or 550, for evaluation, generation of relevance scores for extracted portions of the corpus of data/information, and generation of a confidence score for the newly generated candidate answer.

The processes described above may be done repeatedly as the user sees fit until the user is satisfied with the state of the ranked listing of candidate answers and the corresponding evidence passages associated with the candidate answers in the ranked listing of candidate answers. This information may then be stored in association with the input question, an identifier of the input question, one or more of the queries generated based on the input question, or the like, for later retrieval and use. This stored information may be used for training purposes to train the QA system, e.g., training the operation of the statistical model of the QA system, modifying weights assigned to reasoning algorithms, or the like. This information may also be used to compare results generated by the QA system when evaluating a subsequent submission of the same or similar input question in order to see how the corpus of data/information has changed over time and/or how these changes may have changed the resulting candidate answers generated by the QA system, e.g., comparing the stored candidate answers and corresponding evidence passages with the later generated candidate answers and corresponding evidence passages and identifying the differences. The stored information may also be used as a cache of sorts to provide a quick retrieval of results of similar input questions or similar queries. Other uses of the stored information may also be made based on the operation of the mechanisms of the illustrative embodiments generating this stored information.

Thus, using the mechanisms described above, or equivalent mechanisms in other QA systems generally known in the art which are augmented to include the GUI logic mechanisms of the illustrative embodiments, a system is developed that can be used to generate answers to natural language questions posed to the QA system and present the resulting candidate answers and corresponding evidence passages in support thereof. The QA system may comprise multiple engines or modules comprising logic for performing various operations for processing an input question in a natural language, searching a corpus of information for generating candidate answers to the input question, ranking or scoring the candidate answers, performing a final merging of the scored or ranked candidate answers to generate a single ultimate answer to the input question. Thus, the QA system may comprise engines/modules for performing question analysis, content analysis of documents in a corpus of information, primary search, candidate answer generation, candidate answer scoring/ranking, and final merging of candidate answers. In addition, with the mechanisms of the illustrative embodiments, graphical user interface logic, engines, modules, or the like, are provided which provide the user with the ability to collaborate with the QA system in the various ways previously described to modify or adjust the candidate answer generation and use of evidence passages for evaluating the candidate answers.

Figure 6:
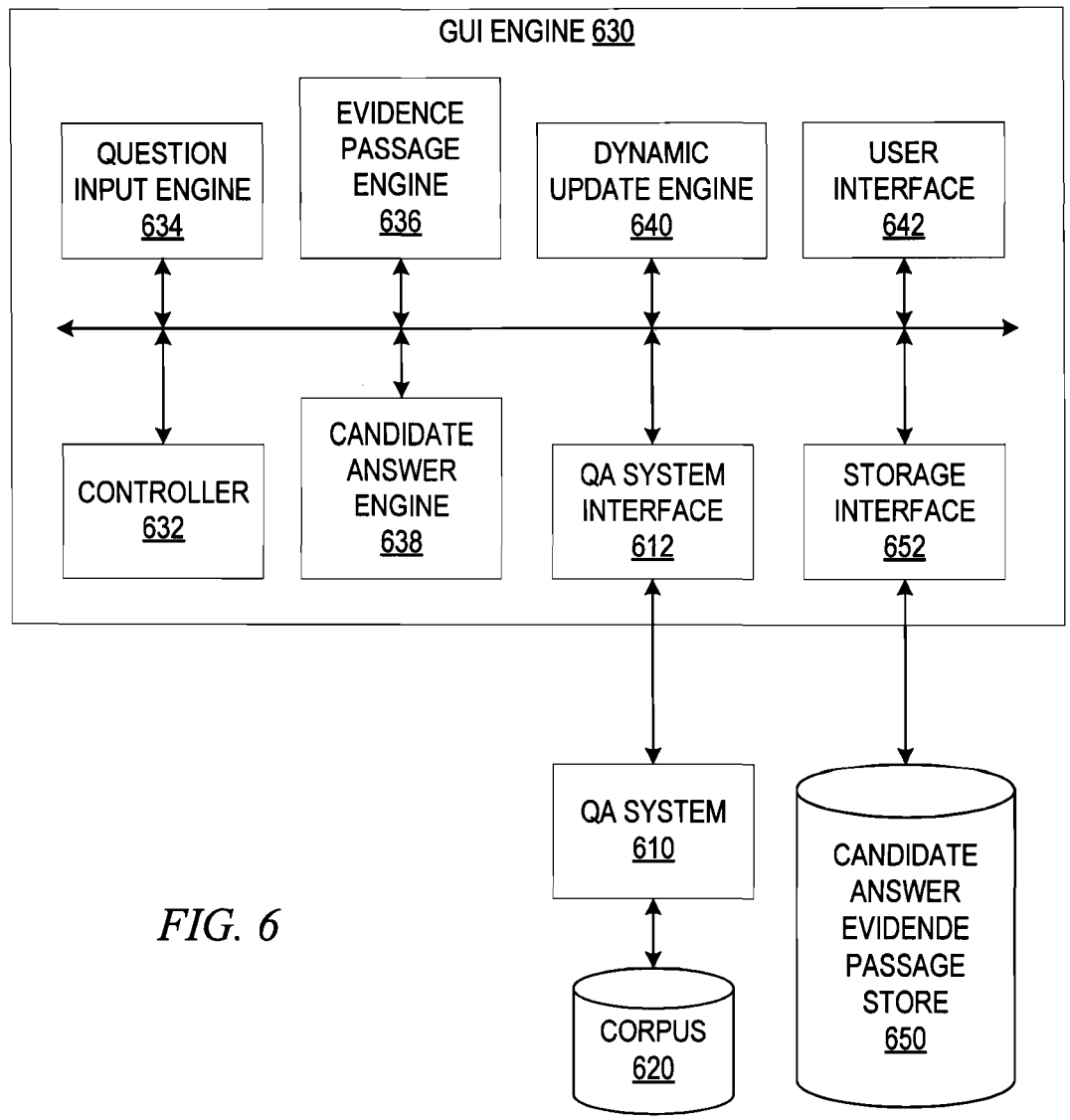
FIG. 6 is an example diagram illustrating an example block diagram of a graphical user interface engine in accordance with one illustrative embodiment.

FIG. 6 is an example diagram illustrating an example block diagram of a graphical user interface engine in accordance with one illustrative embodiment. The elements shown in FIG. 6 may be implemented in software, hardware, or any combination of software and hardware. In one illustrative embodiment, the elements of FIG. 6 are implemented as software instructions executed by one or more processors of one or more data processing systems, and data stored in one or more storage devices of one or more data processing systems. In other illustrative embodiments, one or more of the elements shown in FIG. 6 may be implemented in hardware, such as in Application Specific Integrated Circuits (ASICs), firmware, or the like. A combination of such implementations may also be utilized. For purposes of the following description, it will be assumed that the elements in FIG. 6 are software instructions executed by one or more processors of one or more data processing systems.

As shown in FIG. 6, the graphical user interface (GUI) engine 630 of one illustrative embodiment interfaces with a QA system 610 via a QA system interface 612 and a candidate answer evidence passage storage system 650 via storage interface 652. The QA system 610 is any suitable QA system, such as the Watson™ QA system described above, which operates on an input question to generate candidate answers and evaluate those candidate answers for the purposes of providing one or more of the candidate answers as an actual answer for the input question. The input question may be received via the question input engine 634 of the GUI engine 630, for example. In one illustrative embodiment, the GUI engine 630 may execute on a server computing device and may be accessible by client computing devices over one or more data networks such that the GUI generated by the GUI engine 630 is rendered on a client computing device for interaction with by a user and whose interactions are transmitted to the server computing device for processing. Alternatively, the GUI engine 630 may execute on the same computing device as the one operated by the user and input may be received directly from the user, via a user interface device, such as a keyboard, mouse, microphone, and/or the like.

The question input engine 634 provides fields for the user to enter an input question and may then format the question for submission to the QA system 610. Based on the input question received via the question input engine 634, the QA system 610 performs the input question parsing and analysis, query generation, query application and candidate answer generation, candidate answer and evidence passage evaluation and scoring, etc. as previously described above. The QA system 610 operates on the corpus of data/information 620 to generate the candidate answers (hypotheses), retrieve evidence passages, and perform the various evaluations previously described. The result of the QA system 610 operation is a set of candidate answers, evidence passages associated with the candidate answers, and corresponding relevance and confidence scores which may all be stored in the candidate answer evidence passage storage 650. Moreover, this information may further include links to the source documents in the corpus 620 and other information regarding the veracity and relevancy of the source documents.

The GUI engine 630 further comprises a controller 632, an evidence passage engine 636, a candidate answer engine 638, a dynamic update engine 640, and a user interface 642. The controller 632 controls the overall operation of the GUI engine 630 and comprises logic for coordinating and orchestrating the operation of the other elements of the GUI engine 630 and well as the interfacing of the GUI engine 630 with the QA system 610 and the candidate answer evidence passage storage system 650. The candidate answer engine 638 comprises logic for generating and outputting a portion of a GUI for presenting the candidate answers generated by the QA system 610 or input by a user via the user interface 642, where such input may be a free-form entry of a candidate answer or selection of a sub-portion of an evidence passage, for example, as previously discussed above. The candidate answer portion of the GUI generated by the candidate answer engine 638 may include a ranked listing of the candidate answers, organized by increasing/decreasing confidence score, with associated GUI elements for elimination of the candidate answers from the ranked listing of candidate answers. As mentioned above, in one or more illustrative embodiments, the rankings may be modified based on user input in that user entered or selected candidate answers may be included in the ranked listing of candidate answers despite their particular confidence score but may still be listed in a ranked position based on their confidence score, i.e. even though a user entered candidate answer may not satisfy minimum requirements for inclusion in the ranked listing of candidate answers, it may still be included in the ranked listing but is listed in a position corresponding to its relative confidence score.

The candidate answer engine 638 may further generate GUI elements in association with the candidate answer entries in the GUI that may be selected for eliminating the candidate answers from the ranked listing of candidate answers. The GUI element, when selected by a user, as indicated in user input received via the user interface 642, causes the corresponding candidate answer to be removed from the ranked listing of candidate answers. Moreover, the corresponding entries for evidence passages in the evidence passage portion of the GUI may be automatically updated to reflect the removal of the candidate answer. The ranked listing of candidate answers may also be dynamically updated to re-evaluate the rankings of candidate answers based on the removal of a candidate answer from the ranked listing.

The evidence passage engine 636 comprises logic for generating a portion of the GUI output that lists the evidence passage contributing to the confidence score for each individual candidate answer. That is, the evidence passage portion of the GUI may be organized by candidate answer with the evidence passages contributing to the confidence score of the candidate answer being displayed in association with the candidate answer. The output of the evidence passages in the evidence passage portion of the GUI is done such that sub-portions of the evidence passages, e.g., words, phrases, sentences, and the like, are selectable by a user via the user interface 642 and the user's own user interface input devices, e.g., keyboard, mouse, microphone, etc., so as to create new candidate answers that are automatically added to the ranked listing of candidate answers in response to such selection.

The entries for the evidence passages that are output via the evidence portion of the GUI, as generated by the evidence passage engine 636, may include a representation of the evidence portion and an associated relevance score for the evidence portion as generated by the evaluations performed by the QA system 610. Moreover, the entries may include links to the source documents for the evidence passages for purpose of implementing the drill-down functionality previously described. The drill-down functionality may be facilitated by logic provided in the evidence passage engine 636 which is invoked in response to user input being received via the user interface 642 selecting the link in the entry for the evidence passage.

Moreover, the evidence passage engine 636 generates the evidence passage portion of the GUI with GUI elements for removing evidence passages or modifying the corresponding relevance scores associated with the evidence passages based on user input. In response to a user providing a user input via the user interface 642 that selects a GUI element for removing an evidence passage, the corresponding evidence passage is eliminated from the GUI output and the change is submitted to the QA system 610 for dynamic re-evaluation of the candidate answers. Similarly, in response to the user providing a user input for modifying the relevance score for the evidence passage, the change is communicated to the QA system 610 which may dynamically re-evaluate the candidate answers based on the received change.

The dynamic update engine 640 comprises logic for coordinating the user modifications and selections of GUI elements received via the user interface 642. This may involve coordinating the updating of the evidence passage portion and candidate answer portions of the GUI as well as the submission of the modifications to the QA system 610 for re-evaluation of the candidate answers and/or evidence passages associated with the candidate answers. The resulting candidate answers and associated evidence passages generated via the operation of the QA system 610 and the user collaboration provided via the GUI engine 630 may be stored in the candidate answer evidence passage storage system 650 for later retrieval and use.

Figure 7B:
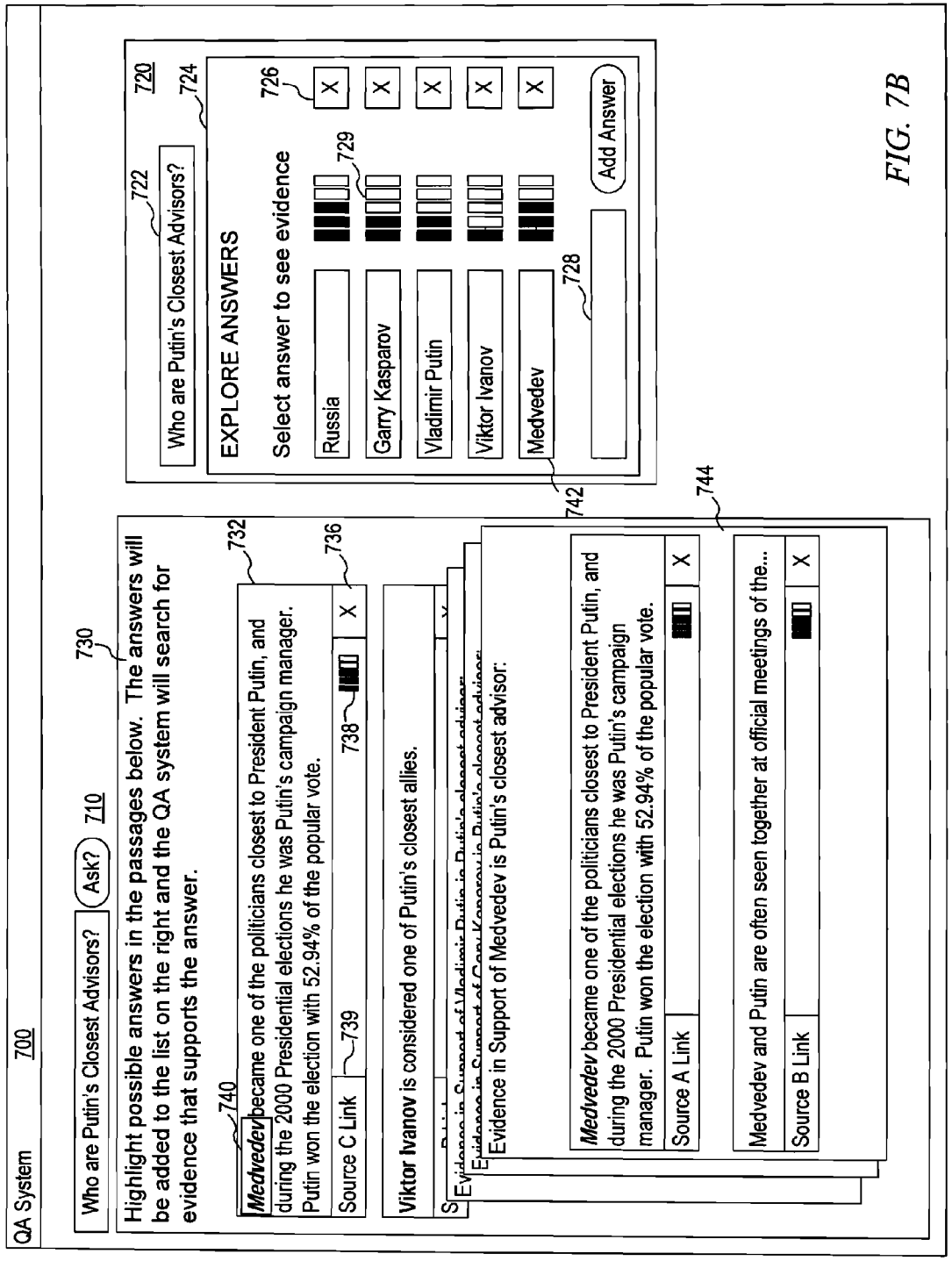

FIGS. 7A-7E are example diagrams illustrating graphical user interfaces and the operation of such graphical user interfaces in accordance with one illustrative embodiment. FIG. 7A illustrates an initial GUI output generated by the GUI engine based on output from the QA system in response to the entry of an input question. FIG. 7B illustrates a GUI output generated by the GUI engine in response to a selection of a sub-portion of an evidence passage for generation of a new candidate answer. FIG. 7C illustrates a GUI output generated by the GUI engine in response to a user selection to remove an evidence passage from the evidence passage portion of the GUI in accordance with one illustrative embodiment. FIG. 7D illustrates a GUI output generated by the GUI engine in response to the user entry of a new candidate answer via a free-form input field in accordance with one illustrative embodiment. FIG. 7E illustrates a GUI output generated by the GUI engine in response to a user selection of a drill-down link of an evidence passage in accordance with one illustrative embodiment.

With reference to FIG. 7A, the GUI 700 includes a question input portion 710 through which a user may input a question for which an answer is sought from the corpus of data/information. The input question entered via the question input portion 710 is submitted to the QA system for generation of candidate answers. The GUI 700 further includes a candidate answer portion 720 for outputting a ranked listing of candidate answers generated by operation of the QA system on the input question entered into question input portion 710. Moreover, the GUI 700 further includes an evidence passage portion 730 for outputting the evidence passages associated with candidate answers in the candidate answer portion 720.

The candidate answer portion 720 further includes a field 722 for listing the input question for which the candidate answers were generated, a field 724 for outputting a ranked listing of candidate answers with corresponding GUI elements 726 for removal of the candidate answers from the ranked listing of candidate answers, and a field 728 for free-form entry of a new candidate answer to be added to the ranked listing of candidate answers. GUI elements 729 may further be provided for indicating a corresponding confidence measure associated with the candidate answer as generated by the QA system. In some illustrative embodiments, the GUI elements 729 associated with the candidate answers may be user selectable and modifiable so that the user may specify his/her own subjective determination of the confidence of the candidate answer. This may cause changes in the relative ranking of the candidate answers within the candidate answer portion 720 as well as modifying the graphical display of the GUI elements 729 to reflect the user specified confidence in the corresponding candidate answer.

The ranked listing of candidate answers lists the candidate answers generated by the QA system and/or candidate answers generated in response to user input, e.g., free-form entry of a candidate answer via the field 728 or selection of a sub-portion of an evidence passage in the evidence passage portion 730 of the GUI 700. The listing may be ordered according to the confidence scores generated by the QA system for each of the candidate answers. Moreover, the listing may include only those candidate answers having corresponding confidence scores meeting a predetermined minimum confidence score. In some illustrative embodiments, the ranked listing of candidate answers may further include user entered or selected candidate answers regardless of whether those user entered or selected candidate answers meet the predetermined minimum confidence score or not, but may still be ranked according to their relative confidence scores.

The GUI elements 726 are user selectable to remove the corresponding candidate answer from the ranked listing of candidate answers. In response to such GUI elements 726 being selected by a user, the corresponding candidate answer is removed from the ranked listing of candidate answers field 724 and the corresponding evidence passage entries are automatically removed from the evidence passage portion 730 of the GUI 700. Moreover, the individual entries for the candidate answers are selectable to cause the evidence passage portion 730 to automatically bring to the forefront of the GUI 700 display the corresponding evidence passages for the selected candidate answers. In this way, the user is able to select individual candidate answer entries to further explore the evidence passages contributing to the confidence score and ranking of the candidate answer in the evidence passage portion 730 of the GUI 700.

The evidence passage portion 730 of the GUI may be organized according to the candidate answers in the candidate answer portion 720 such that entries of evidence passages contributing to a particular candidate answer are displayed in association with the candidate answer in the evidence passage portion 730. In the depicted example, the correlation between evidence passages and candidate answers is provided by generating separate windows or listing of evidence passages for each of the candidate answers. However, other organizations or arrangements of evidence passages may be used without departing from the spirit and scope of the illustrative embodiments.

Each evidence passage entry 732 in the evidence passage portion 730 is rendered such that sub-portions 734 of the evidence passage entry 732 may be user selectable to automatically generate a new candidate answer in the candidate answer portion 720. In addition, each evidence passage entry 732 may further have an associated GUI element 736 for removing the evidence passage from the evidence passages associated with a candidate answer. Furthermore, GUI element 738 is provided for outputting an indication of a relevance score associated with the evidence passage. The GUI element 738 may be user manipulated so as to adjust the indication of the relevance score and thus, modify the relevance score based on the user's subjective determination of the relevance of the evidence passage to the candidate answer, e.g., selecting a different number of bars, stars, entry of a numerical value indicative of relevance on a scale of relevance scores, or the like. In addition, drill-down GUI elements 739 are provided for user selection to drill-down to source document information for output to the user for further evaluation of the corresponding evidence passage and its related context, source document veracity information, and the like.

User input to either of the candidate answer portion 720 and/or the evidence passage portion 730 to modify the content of these portions may be communicated back to the QA system for re-evaluation of the evidence passages and candidate answers. This may involve submitting these changes to the stages 540 and/or 550 of the QA system pipeline 500 in FIG. 5 as previously described above, for example. This will in turn result in an update of the content of the candidate answer portion 720 and/or evidence passage portion 730 based on results of the operation of the QA system on the changes made to these portions of the GUI 700.

FIG. 7B illustrates a GUI output generated by the GUI engine in response to a selection of a sub-portion of an evidence passage for generation of a new candidate answer. As shown in FIG. 7B, sub-portion 740 is selected by a user via a user interface of the GUI engine for automatic generation of a new candidate answer 742 that is added to the ranked listing of candidate answers and evaluated by the QA system to identify evidence passages in support of, or detracting from, the valuation of the candidate answer with regard to correctness of the candidate answer for the input question. The corresponding entries 744 in the evidence passage portion 730 of the GUI 700 are generated for the newly generated candidate answer.

Thus, in the depicted example, as shown in FIG. 7A, an input question "Who are Putin's closest advisors?" is input resulting in the QA system generating an initial set of candidate answers including the candidate answers "Russia", "Garry Kasparov," "Vladimir Putin", and "Viktor Ivanov" as candidate answers, as shown in the candidate answer portion 720. The user then selects the name "Medvedev" 740 from an evidence passage which causes an additional candidate answer 742 to be added to the listing of candidate answers in candidate answer portion 720. The new candidate answer 742 is provided to the QA system for evaluation which results in the new evidence passage portion 744 comprising entries in support of, or detracting from, the evaluation of the candidate answer "Medvedev" being a correct answer for the input question. Corresponding relevance scores, confidence scores, and links to source documents are likewise generated and provided in the various portions of the GUI 700 as discussed previously.

FIG. 7C illustrates a GUI output generated by the GUI engine in response to a user selection to remove an evidence passage from the evidence passage portion of the GUI in accordance with one illustrative embodiment. The removal of an evidence passage from the evidence passage portion 730 is best seen when comparing FIG. 7C to FIG. 7A which depicts the initial GUI output generated. As shown in FIG. 7C, when compared to FIG. 7A, the evidence passage 750 has been removed by the user's selection of the removal GUI element 736 corresponding to the evidence passage 750. That is, while the evidence passage 750 referencing Vladimir Putin's dog Koni was initially found by the QA system to be relevant to a candidate answer of the input question, the user may determine that Koni is not in fact a close advisor to Vladimir Putin and thus, the evidence passage may be removed from the evidence passage listing for the candidate answer. As a result, the evidence passage 750 is removed in response to the user selecting the corresponding removal GUI element 736.

In addition, because this evidence passage 750 contributed to the confidence score associated with the candidate answer, the confidence score representation 729 associated with the corresponding candidate answer may be updated to reflect any change in the confidence score due to the elimination of the evidence passage. This update is automatically performed in response to the user's input removing the evidence passage, effectively indicating that the evidence passage is not relevant to the evaluation of the candidate answer. Thus, for example, if the Koni evidence passage was negatively affecting the confidence score for the corresponding candidate answer, the removal of the evidence passage 750 may result in a confidence score for the corresponding candidate answer being increased as the evidence passage 750 is no longer detracting from the confidence score for the candidate answer.

FIG. 7D illustrates a GUI output generated by the GUI engine in response to the user entry of a new candidate answer via a free-form input field in accordance with one illustrative embodiment. This is similar to the creation of a new candidate answer in response to a user selection of a sub-portion of an evidence passage except that, rather than predicating the creation of the new candidate answer on a selected sub-portion of an evidence passage, the user is free to enter any text into the free-form text field 728 and have that text added as a new candidate answer to the ranked listing of candidate answers 724. The newly entered candidate answer is evaluated by the QA system as described above so as to generate a corresponding set of entries 760 in the evidence passage portion 730 and entry in the candidate answer portion 720 with corresponding confidence score and the like. This may require re-evaluation of the ranked listing of candidate answers based on the confidence score generated for the new candidate answer relative to the other candidate answers.

FIG. 7E illustrates a GUI output generated by the GUI engine in response to a user selection of a drill-down link of an evidence passage in accordance with one illustrative embodiment. As shown in FIG. 7E, the evidence passages of the evidence passage portion 730 are output with corresponding drill-down GUI elements 739. In response to a user selecting a drill-down GUI element 739 of a corresponding evidence passage 770, a corresponding display of source document information 780 is provided. This display of source document information 780 may include various information about the source document in the corpus from which the evidence passage was generated. This information may include a name of the source document, a veracity measure for the source document as may be generated by the QA system, topic or category information associated with the source document, or even the actual content of the source document for review by the user, or at least a portion of the content of the source document in close proximity to the portion of the source document used to generate the evidence passage, e.g., a few paragraphs before and after the evidence passage in the source document. From this information the user may evaluate the evidence passage and either manipulate the removal GUI element, or modify the relevance measure indicator of the evidence passage entry to reflect the user's subjective determination of the relevance of the evidence passage based on the additional information presented to the user regarding the source document in response to the user's selection of the drill-down GUI element 739.

Thus, as described above, the illustrative embodiments provide mechanisms for assisting a user in collaborating with a QA system during the generation of candidate answers for an input question. These mechanisms comprise a graphical user interface and associated logic for user manipulation of the output of candidate answers and corresponding evidence passages in the graphical user interface which in turn causes a QA system to re-evaluate the candidate answers and potentially store the modified candidate answer information and corresponding evidence passages. In this way, the user is given greater input to the operation of the QA system and the results generated by the QA system for an input question.

It should be appreciated that the example GUIs shown in FIGS. 7A-7E are only examples and many modifications to the depicted GUIs may be made without departing from the spirit and scope of the illustrative embodiments. For example, while the relevance score GUI elements and confidence score GUI elements are shown as a series of bars, other configurations may be utilized including other graphical elements, e.g., starts, check marks, etc., numerical representations, alphabetical rankings, or the like. Moreover, a user may modify such relevance scores and confidence scores by inputting actual numerical values for the relevance score and confidence score. In addition, while the depicted GUIs show the separate ranked listings of evidence passages being presented in separate windows for ease of depiction, other configurations may be utilized include a scrollable listing with separate sections for each candidate answer, separate panels, etc. Many different modifications to the depicted GUI will be apparent to those of ordinary skill in the art in view of the present description and such modifications are intended to be encompassed by the present description.

Figure 8:
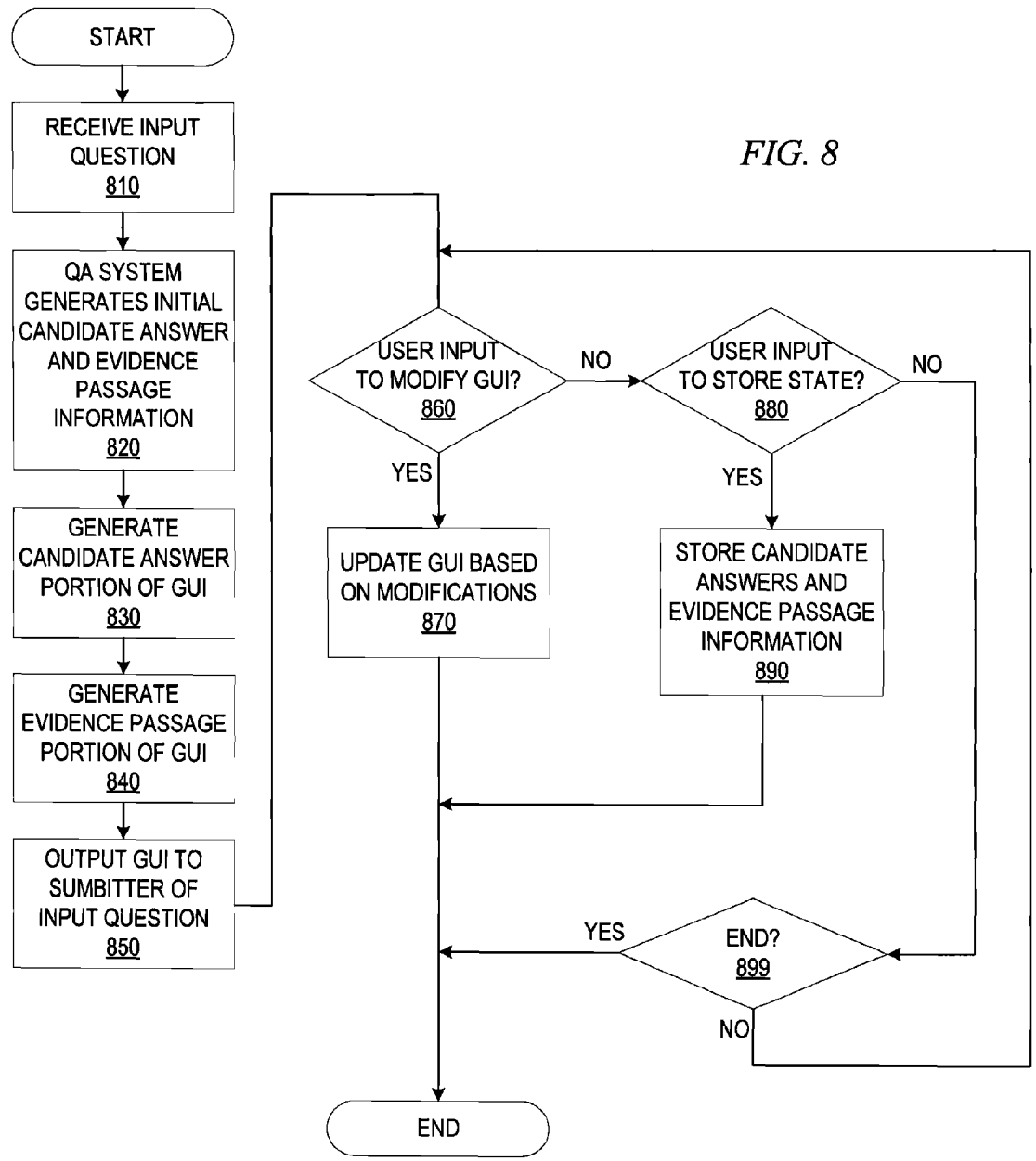
FIG. 8 is a flowchart outlining an example operation for generating a graphical user interface for user collaboration with a question and answer system in accordance with one illustrative embodiment.

FIG. 8 is a flowchart outlining an example operation for generating a graphical user interface (GUI) for user collaboration with a question and answer system in accordance with one illustrative embodiment. As shown in FIG. 8, the operation starts by receiving an input question from a user or client device of a user (step 810), such as via the question input portion 710 of the GUI 700 in FIG. 7A, for example. The input question is provided to a QA system which generates an initial listing of candidate answers, corresponding confidence measures, and corresponding evidence passages, relevance scores, and links to source documents for each of the candidate answers (step 820). A candidate answer portion of a graphical user interface, such as candidate answer portion 720 in FIG. 7A, for example, is generated comprising a ranked listing of candidate answers (e.g., 724 in FIG. 7A) based on the confidence scores, GUI elements for removal of a candidate answer (e.g., elements 726 in FIG. 7A), GUI elements indicative of each candidate answer's confidence score (e.g., represented by the bars 729 in FIG. 7A), and a GUI field for free-form entry of candidate answers, e.g., field 728 in FIG. 7A (step 830).

An evidence passage portion of a graphical user interface, such as evidence portion 730 in FIG. 7A, for example, is generated organized by candidate answer (step 840). As mentioned above, this evidence passage portion may comprise separate portions for each candidate answer with evidence passage entries being provided in association with the candidate answers for which the evidence passage is determined to be relevant and to whose confidence score the evidence passage's relevance score contributes. The evidence passage entry, e.g., 732 or 750 in FIG. 7A, may comprise the content of the evidence passage, a GUI element for removal of the evidence passage (e.g., 736 in FIG. 7A), a GUI element for representing a relevance score (e.g., 738 in FIG. 7A) associated with the evidence passage, and a GUI element for drilling down to the source document information for the evidence passage (e.g., 739 in FIG. 7A).

The GUI comprising the candidate answer portion and evidence passage portion are output to the user or client device submitting the original input question (step 850). The method waits for a user input modifying a portion of the GUI (step 860) and, in response to receiving a user input modifying a portion of the GUI, the GUI is updated, possibly after forwarding the modifications to the QA system and receiving a re-evaluation of candidate answers and evidence passages associated with the input question (step 870). If a user input modifying the portion of the GUI is not received, a determination is made as to whether a user input for storing the current state of the candidate answers and corresponding evidence passages is receive (step 880). If so, then the candidate answers and corresponding evidence passage information is stored in association with the input question or queries generated from the input question (step 890). Otherwise, if there is a time out condition (step 899) or a user input ending the operation of the GUI engine, the operation terminates.

Figure 9:
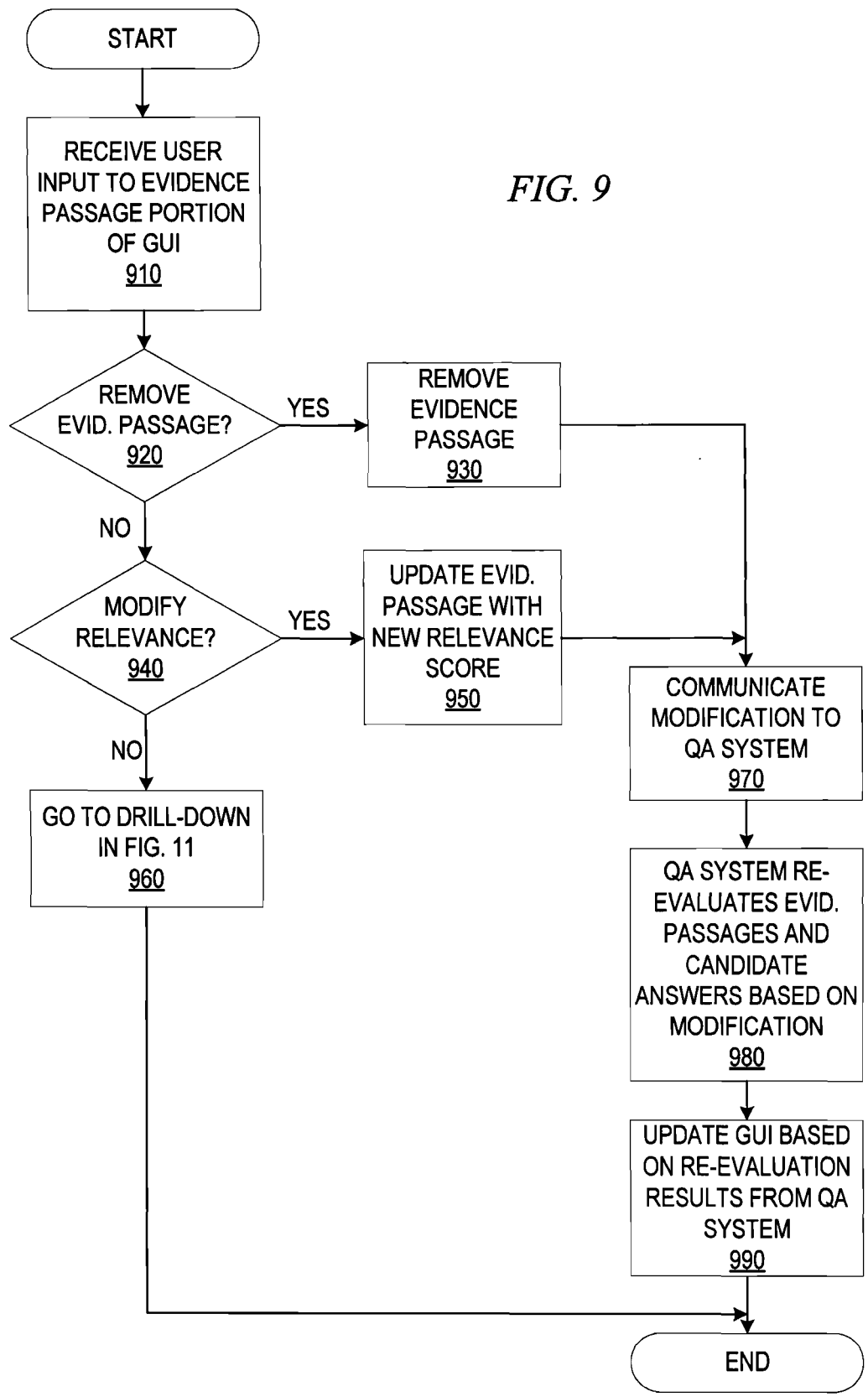
FIG. 9 is a flowchart outlining an example operation for modifying a evidence passage portion of a graphical user interface in accordance with one illustrative embodiment.

FIG. 9 is a flowchart outlining an example operation for modifying an evidence passage portion of a graphical user interface in accordance with one illustrative embodiment. As shown in FIG. 9, the operation starts by receiving a user input to an evidence passage portion of a user collaboration GUI generated in accordance with the illustrative embodiments described herein (step 910). A determination is made as to whether the user input indicates a removal of an evidence passage from the evidence passage portion of the GUI (step 920), such as by selecting a removal GUI element 736 associated with an evidence passage portion 732 in FIG. 7A, for example. If so, the evidence passage is removed from the GUI output (step 930), such as shown and described above with regard to FIG. 7C, for example. If the user input does not indicate a removal of an evidence passage, then a determination is made as to whether the user input is to modify a relevance score for an evidence passage (step 940), e.g., by manipulating a relevance score element 738 of a evidence passage 732 in FIG. 7A, for example. If so, then the output of the evidence passage is updated to reflect the increase/decrease of the relevance score for the evidence passage (step 950). It should be appreciated that, in such a case, the output may be updated so as to re-organize a ranked listing of the evidence passages in the evidence passage portion of the GUI based on the change to the relevance scores, e.g., such that the order of evidence passages is updated by moving the evidence passage to a position in the ranked listing corresponding to its new updated relevance score. Otherwise, if the input is not a removal or modification of the relevance score of an evidence passage, the user input is for drilling-down into the source document information and the operation branches to the operation outlined in FIG. 11 (step 960).

After either step 930 or 950, the modification to the evidence passage is communicated to the QA system (step 970) which re-evaluates the evidence passages and candidate answers to generate new relevance scores, confidence scores, ranking of candidate answers, ranking of evidence passages relative to one another within a ranked listing of evidence passages for a candidate answer, or the like (step 980). The updated QA system output is provided to the GUI engine which updates the GUI to reflect the new relevance scores, confidence scores, rankings, and the like, generated as a result of the modifications made by the user via the GUI (step 990). The operation then terminates.

Figure 10:
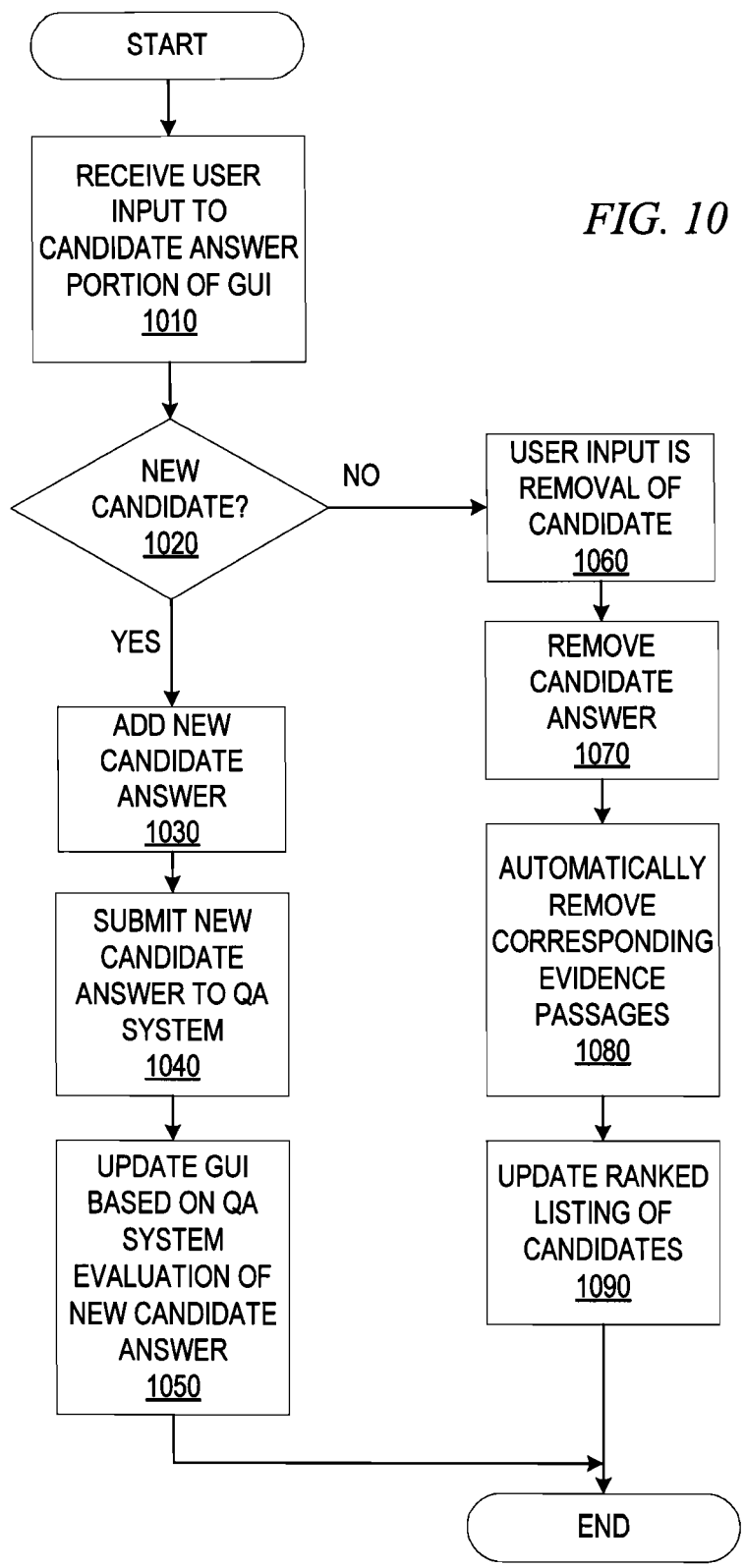
FIG. 10 is a flowchart outlining an example operation for modifying a candidate answer and evidence passage portion of a graphical user interface in accordance with one illustrative embodiment.

FIG. 10 is a flowchart outlining an example operation for modifying a candidate answer and evidence passage portion of a graphical user interface in accordance with one illustrative embodiment. The operations starts by receiving a user input, via a user collaboration GUI generated in accordance with the illustrative embodiments described herein, specifying a change to the candidate answers in the candidate answer portion of the GUI (step 1010). This may involve the selection of a sub-portion of an evidence passage, e.g., a word, phrase, sentence, or the like, e.g., 734 in FIG. 7A. Alternatively, this may involve the free-form entry of a candidate answer (such as described above in FIG. 7D, for example) or the selection of a candidate answer for removal from the ranked listing of candidate answers, for example.

A determination is made as to whether the user input specifies a new candidate answer to be added to the ranked listing of candidate answers (step 1020). If so, then the new candidate answer is added to the ranked listing of candidate answers (step 1030), the new candidate answer is submitted to the QA system for evaluation (step 1040), and the results of the QA system evaluation are used to update the GUI to include the new candidate answer, confidence score, corresponding evidence passages and associated relevance scores, and the like (step 1050).

If the user input is not the addition of a new candidate answer, then the user input is for removal of an existing candidate answer (step 1060). The selected candidate answer for removal is removed from the ranked listing of candidate answers (step 1070) and the corresponding evidence passages for the removed candidate answer are removed from the evidence passages portion of the GUI (step 1080). The ranked listing of candidate answers is then updated to represent the removal of the candidate answer by adjusting the rankings if necessary based on the removal of the candidate answer (step 1090). The operation then terminates.

Figure 11:
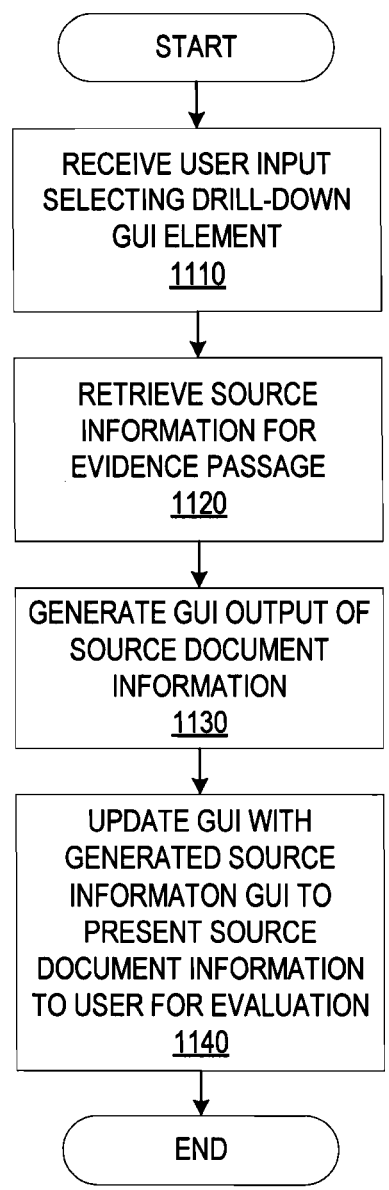
FIG. 11 is a flowchart outlining an example operation for performing a drill-down operation of an evidence passage in accordance with one illustrative embodiment.

FIG. 11 is a flowchart outlining an example operation for performing a drill-down operation of an evidence passage in accordance with one illustrative embodiment. The operation outlined in FIG. 11 may be performed, for example, in response to a user selecting a drill-down GUI element 739 in FIG. 7A, for example. As shown in FIG. 11, the operation starts with receiving user input, via a user collaboration GUI generated in accordance with the illustrative embodiments described herein, selecting a drill-down GUI element associated with an evidence passage entry in an evidence passage portion of the GUI (step 1110). The corresponding source document information for the evidence passage is retrieved (step 1020) and used to generate a GUI output of source document information (step 1030). The GUI output of the source document information may have user selectable elements for obtaining various information about the source document, presenting the content of the source document or a portion of the content in close proximity to the evidence passage, and the like. The source document information GUI output is used to update the user collaboration GUI by presenting the source document information via the GUI (step 1040). The operation then terminates.

As mentioned above, one operation of the illustrative embodiments is to generate relevance scores for the evidence passages used to provide support for, or against, a candidate answer being a correct answer for the input question. The relevance scores generated for the evidence passages may be generated based on a statistical machine learning model, referred to as the justifying passage model (JPM), which is configured and trained based on Subject Matter Expert generation of a JPM ground truth data structure indicating whether evidence passages are justifying/not-justifying of question-answer-passage triplets, or simply question-answer pairs.

That is, when the QA system generates candidate answers for an input question, such as during a training operation or even during runtime operation, the resulting Q-A-P triplet generated, i.e. question-answer-passage triplet, may be stored and submitted to a Subject Matter Expert (SME) (a human being that is an expert in the particular subject matter) for evaluation as to whether the passage itself that supports the candidate answer is "justifying" of the candidate answer for that particular question, i.e. the passage explicitly states the candidate answer as being the candidate answer for the particular question, e.g., for the question "Who was the first president of the United States?" the passage states "the first president of the United States was George Washington" and thus, is justifying of the answer "George Washington." The SME may then provide an input as to whether the passage for that Q-A-P triplet is justifying or not justifying and this information may be stored in a JPM ground truth data structure which may be used for future processing of questions and candidate answers by the QA system, example illustrative embodiments of which will be described in greater detail hereafter. Thus, for each Q-A-P triplet, an additional data value indicative of whether the passage (P) is justifying or not justifying may be stored in association with the Q-A-P triplet.

It should be appreciated that the generation of a Q-A-P triplet ground truth data structure requires a significant investment of computing and human resources. That is, in order to generate a Q-A-P ground truth data structure, training questions must be submitted to the QA system, answers must be generated by the QA system, evidence passages associate with the answer must be identified, and an a human Subject Matter Expert (SME) must spend time evaluating the question, answer, and passage to determine whether the passage is justifying of the answer being a correct answer for the question. Furthermore, this Q-A-P ground truth data structure may change or become incorrect as a corpus of data changes and thus, may need to be periodically updated. As an alternative, the Q-A ground truth data structure that is generated for training the QA system may be may be utilized which is augmented to include a justification value indicating that the answers for the questions in the training Q-A ground truth data structure are considered justifying or not justifying of the corresponding question. This can be used as a quick and less resource intensive approach when needed.

Figure 12:
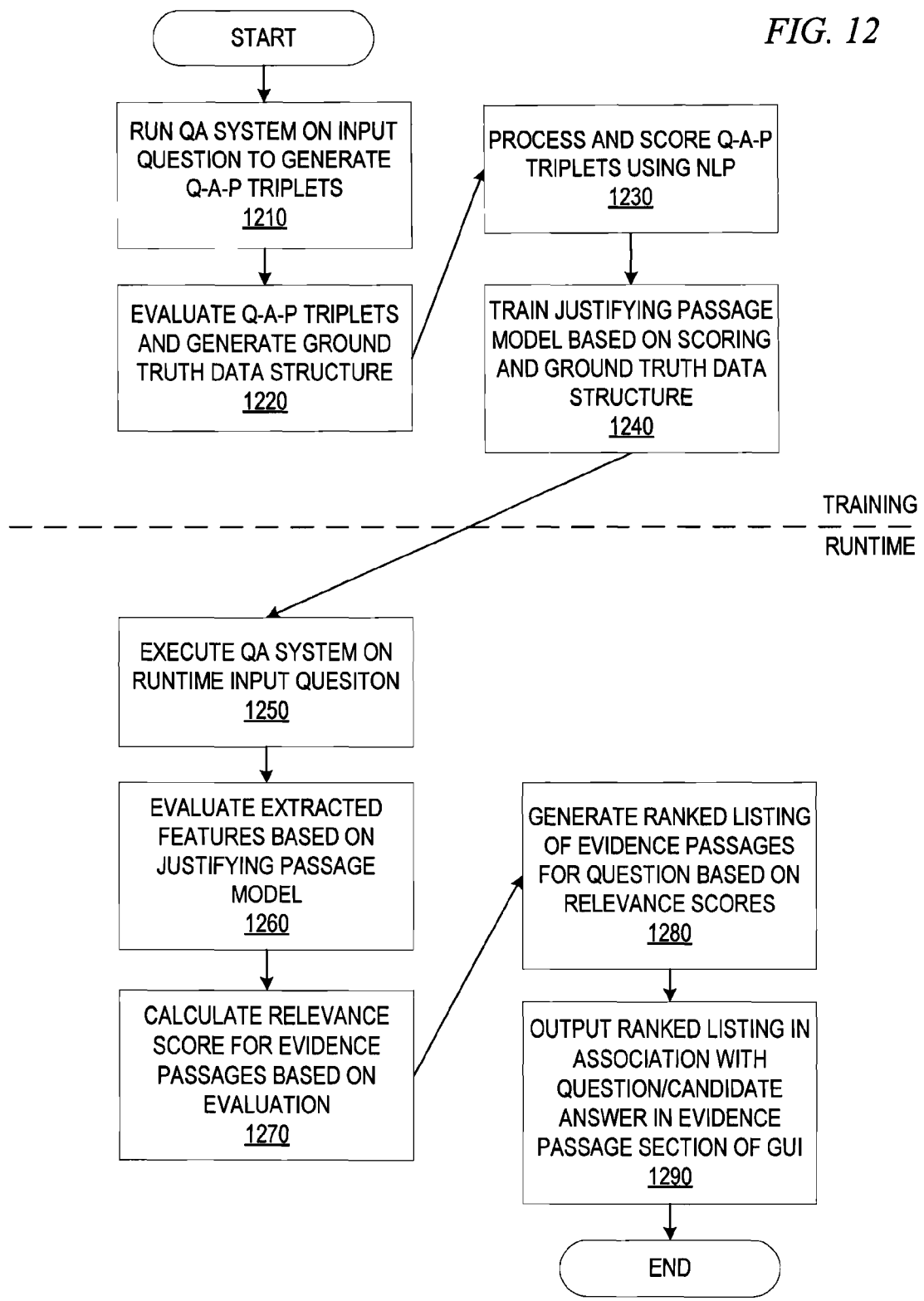
FIG. 12 is a flowchart outlining an example operation for generating relevance scores for evidence passages in accordance with one illustrative embodiment.

FIG. 12 is a flowchart outlining an example operation for generating relevance scores for evidence passages in accordance with one illustrative embodiment. As shown in FIG. 12, the operation starts by running the QA system on an input question to generate question-answer-passage (Q-A-P) triplets (step 1210). The Q-A-P triplets are evaluated by Subject Matter Experts (SMEs) to produce a justifying passage model (JPM) ground truth data structure that provides evaluations of whether the corresponding passages of the Q-A-P triplets are justifying/not-justifying of the question-answer pair (step 1220). The Q-A-P triplets are processed and scored based on various degrees of textual/semantic similarities by reasoning algorithms which may employ various natural language processing techniques (step 1230). The resulting features of the question, the answer, and the passage extracted by the natural language processing performed by the reasoning algorithms, along with the JPM ground truth data structure, are used to train a statistical machine learning model referred to as the justifying passage model (step 1240). Such training may involve, for example, generating the statistical machine learning model, or JPM, by performing a logistic regression utilizing the JPM ground truth data structure.

The QA system is then run on a runtime input question to generate candidate answers and score the candidate answers with regard to confidence based on the evidence passages found in the corpus of information and their relevance to the input question and candidate answer (step 1250). The features of the question, candidate answer, and evidence passage extracted by the QA system during this process are further evaluated against the justifying passage model, i.e. the statistical machine learning model trained in step 1240 above, to determine a probability that the evidence passage is justifying/not-justifying of the candidate answer being a correct answer for the input question (step 1260). These probabilities are used to calculate a relevance rating for the evidence passage (step 1270). The relevance ratings of the various evidence passages are compared and ranked relative to one another to generate a ranked listing of evidence passages associated with the input question (step 1280). The resulting ranked listing may then be output in an evidence passage portion of a GUI for use by a user either for the question itself, organized by candidate answers, or both (step 1290).

As noted above, the JPM that is generated through the evaluation of Q-A pairs or Q-A-P triplets and trained in the manner described above may be utilized during runtime operation of a QA system in many different ways depending upon the particular desired implementation. In one illustrative embodiment, the trained statistical machine learning model, i.e. JPM, is used to filter evidence passages when considering the evidence passages for purposes of candidate answer generation. In another illustrative embodiment, the JPM is used during final scoring and ranking of candidate answers to thereby modify the confidence scores based on whether the evidence passages are justifying of the corresponding candidate answer. In yet another illustrative embodiment, the JPM is used to perform supporting passage retrieval during candidate answer generation in a parallel operation with context dependent scoring. Each of these implementations and embodiments will be described in greater detail hereafter with regard to FIGS. 13-15. It should be appreciated, however, that these are only example embodiments illustrating some of the many anticipated applications of the JPM generated by the mechanisms of the illustrative embodiments and other implementations and embodiments may be devised in view of the present description and are intended to be within the spirit and scope of the present invention. That is, any implementation or embodiment that utilizes a JPM to affect the candidate answer generation of a QA system is intended to be within the spirit and scope of the present invention.

Figure 13:
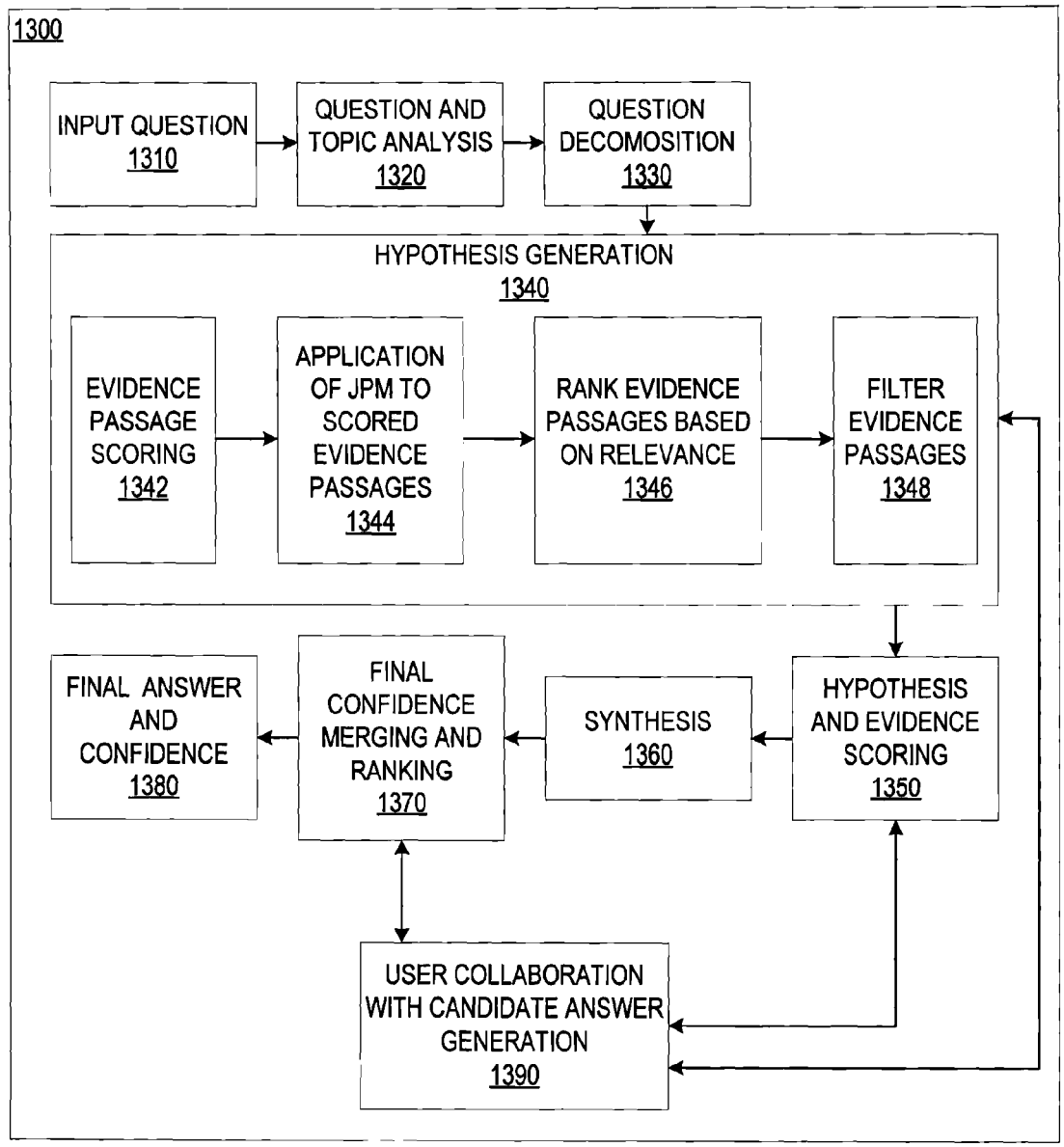
FIG. 13 is a diagram illustrating an operation for applying a justifying passage model to evidence passages in order to filter the evidence passages during candidate answer generation in accordance with one illustrative embodiment.

FIG. 13 is a diagram illustrating an operation for applying a justifying passage model to evidence passages in order to filter the evidence passages during candidate answer generation in accordance with one illustrative embodiment. In this illustrative embodiment, the JPM is used with a QA system in which a large number of evidence passages from the corpus are returned for evaluation in order to provide as much recall as possible, where "recall" refers to how many correct items were identified correctly by the system (i.e. using a ground truth table, recall refers to the ratio of true positives to the sum of true positives and false negatives (tp/(tp+fn)). In this illustrative embodiment, the JPM is used to generate relevance scores for the evidence passages and filter the large number of evidence passages based on their relevance scores and pre-determined filter criteria, to generate a smaller set of evidence passages that provides for maximum recall while reducing the amount of evidence passages that are submitted to the QA system pipeline for further processing, e.g., hypothesis generation stage processing, hypothesis and evidence scoring stage processing, or any of the other further downstream processing of the QA system pipeline. In this way, runtime performance of the QA system pipeline is improved by reducing the number of evidence passages needing to be processed but doing so in such a way as to maximize the recall, i.e. utilizing the more justifying evidence passages, and hence relatively more relevant evidence passages, from the larger set of evidence passages and filtering out the less justifying evidence passages, and hence relatively less relevant evidence passages, from the set of evidence passages considered during further QA system pipeline processing.

As shown in FIG. 13, in this illustrative embodiment, the QA system pipeline operates much as already described above with regard to FIG. 5 in which an input question, in a natural language format, is received during stage 1310 and then parsed using natural language processing (NLP) techniques to extract major features from the input question and classify the major features according to types during stage 1320. The identified major features may then be used during the question decomposition stage 1330 to decompose the question into one or more queries that may be applied to the corpus of data/information in order to generate one or more hypotheses. The queries may be applied, as part of the hypothesis generation stage 1340, to the corpus of data/information to retrieve evidence passages, identifying potential hypotheses for answering the input question, which can then be evaluated. That is, the application of the queries results in the extraction of portions of the corpus of data/information, referred to herein as the evidence passages, matching the criteria of the particular query.

In accordance with the present illustrative embodiments, the evidence passages retrieved, during hypothesis generation 1340, from the corpus by the application of the one or more queries generated by the question decomposition 1330 may have confidence scores generated, during stage 1342, based on the characteristics of the evidence passage in a manner as previously described above with standard QA system pipeline operation. That is, the evidence passages may have scoring algorithms run on the evidence passages to evaluate the characteristics of the evidence passage and generate a passage score indicating a degree to which the evidence passage supports or does not support a corresponding candidate answer. This is opposed to scoring algorithms that score the candidate answer itself. The Q-A-P ground truth data structure is used to train the statistical model, i.e. the justifying passage model, to set weights for these scores which are then used to determine a confidence associated with the candidate answer and rank the evidence passages. Thus, the evidence passages are evaluated to determine a level of confidence associated with each passage that the candidate answer is the correct answer for the particular input question, e.g., evidence passage P1, based on various natural language processing characteristics of evidence passage P1, indicates that there is a 85% probability that answer A1 is the correct answer for question Q1 whereas evidence passage P2 indicates that there is a 65% probability that answer A1 is the correct answer for question Q1. Thus, each evidence passage returned from the application of the queries may have a particular confidence score associated with the triplet Q-A-P indicting the confidence that the answer (A) is the correct answer for the question (Q).

With the present illustrative embodiment, the justifying passage model (JPM) may be applied, during stage 1344, to the evidence passages of the Q-A-Ps to generate relevance scores for the evidence passages based on the JPM's indication of whether a particular evidence passage is justifying of the answer. For example, a unique identifier of the evidence passage, the Q-A-P, or the like, may be used as a basis for performing a lookup operation in a JPM ground truth data structure that correlates the evidence passage, candidate answer, and/or question with a corresponding indicator of whether the evidence passage is justifying or not justifying. The relevance score may be a combination of the confidences score generated during stage 1342 and weights or modifying factors generated based on the trained JPM and JPM data structure indicating whether the answer is justifying or not for the particular Q-A-P.

The relevance score is indicative of the relevance of the particular evidence passage to the candidate answer with regard to the candidate answer being a correct answer for the input question. Thus, the relevance is a combination of the factors of the level of confidence that the evidence passage provides for the candidate answer being the correct answer for the input question, and the degree to which the evidence passage is justifying of the candidate answer being the correct answer for the input question. For example, the relevance score may be calculated as a logistic regression score, e.g., assume one has 3 passage scores x1, x2, and x3 and the JPM provides weights for features as wN, then the relevance score may be calculated as score=x1*w1+x2*w2+x3*w3+c, where c is a constant value.

The resulting relevance scores may be associated with the evidence passages and used by SMEs to generate a JPM ground truth data structure that is then used to train the JPM, and specifically to train the JPM to generate weights to be applied to the passage scores and thereby generate a confidence score for the evidence passage. During runtime operation, the trained JPM may then be applied to the evidence passages such that the evidence passages may be ranked, in stage 1346, according to their confidence scores, e.g., highest confidence score to lowest confidence score, lowest to highest, or the like. The resulting ranked listing of evidence passages, or Q-A-P triplets, may further be filtered in stage 1348 in accordance with the application of filter criteria. For example, the filter criteria may state that a pre-determined number of the highest ranking evidence passages from the ranked listing of evidence passages are to be subjected to further processing while all other evidence passages are filtered out, e.g., the top 25 ranked evidence passages are kept while the remaining evidence passages are filtered out. For example, if the number of evidence passages, or Q-A-P triplets, returned by the applications of the queries is 1000 evidence passages, the filtering of these evidence passages by the mechanisms of the illustrative embodiments to a smaller sub-set, e.g., top ranked 25 evidence passages, greatly reduces the number of evidence passages that must be processed by further downstream stages of the QA system pipeline 1350-1390 (which operate in a similar manner as described above with corresponding ones of stages 550-590 in FIG. 5).

It should be appreciated that the filter criteria may take many different forms with the above example being used as only a simple example for illustrative purposes. The filter criteria may be more complex, may be combination of filter criteria, or any other suitable filter criteria readily apparent to those of ordinary skill in the art in view of the present description. For example, the filter criteria may be of the type, return evidence passages having a relevance score above a minimum relevance score, but only return the top 25 of those evidence passages having the minimum relevance score or return every $5^{th}$ evidence passage within the ranked listing whose relevance score is above the minimum relevance in order to get a broader spectrum of the evidence passages meeting the minimum relevance score requirements. Any combination of filter criteria that are configured to achieve a desired performance of the QA system pipeline while reducing the size of the evidence passages processed by downstream QA system pipeline stages is intended to be within the spirit and scope of the illustrative embodiments.

Thus, with the mechanisms of this illustrative embodiment, the large set of evidence passages that are returned as a result of the decomposition of the input question and application of the corresponding queries to the corpus of data/information may be reduced through a filtering process to a smaller set of evidence passages based on a determined relevance of the evidence passages to their corresponding candidate answers. Furthermore, since the filtering is performed based on the relevance of the evidence passages, which takes into consideration not only the confidence of that the evidence passage generates in the candidate answer, but also whether the evidence passage itself is justifying of the answer, the resulting filtered set of evidence passages are guaranteed to be the most relevant evidence passages with regard to a determination as to whether the candidate answer is the correct answer for the input question. Thus, the mechanisms of the illustrative embodiments are able to leverage a high recall approach of the QA system pipeline (very large number of evidence passages returned) while minimizing the impact on the QA system pipeline (e.g., runtime processing) through application of the JPM to filter out less relevant evidence passages.

It should be appreciated that while FIG. 13 illustrates stages 1342-1348 as being sub-stages of the hypothesis generation stage 1340, the illustrative embodiments are not limited to such. Rather, the stages 1342-1348, or a portion of stages 1342-1348, may be part of other stages of the QA system pipeline, such as the hypothesis and evidence scoring stage 1350 for example, or may be a separate set of stages of the QA system pipeline 1300. The illustrative embodiments are not limited to the particular arrangement of stages shown in FIG. 13. Moreover, it should be appreciated that the logic for implementing the operations outlined above for stages 1342-1348 may be implemented in an evidence passage engine, such as evidence passage engine 636, for example, or other software/hardware logic of a data processing system.

In addition to mechanisms for utilizing the JPM to perform filtering of evidence passages for processing by downstream QA system pipeline stages, illustrative embodiments are provided herein for utilizing the JPM to adjust final confidence scores and rankings of candidate answers. That is, rather than implementing the JPM during hypothesis generation or hypothesis and evidence scoring, for example, the JPM may be implemented during final confidence merging and ranking in the QA system pipeline to improve question answering accuracy by providing a measure of the relatedness of the evidence passage to the input question, i.e. a relevance of the evidence passage is used as a basis for modifying the confidence score associated with the candidate answer based on how relevant the evidence passage is to the question.

Figure 14:
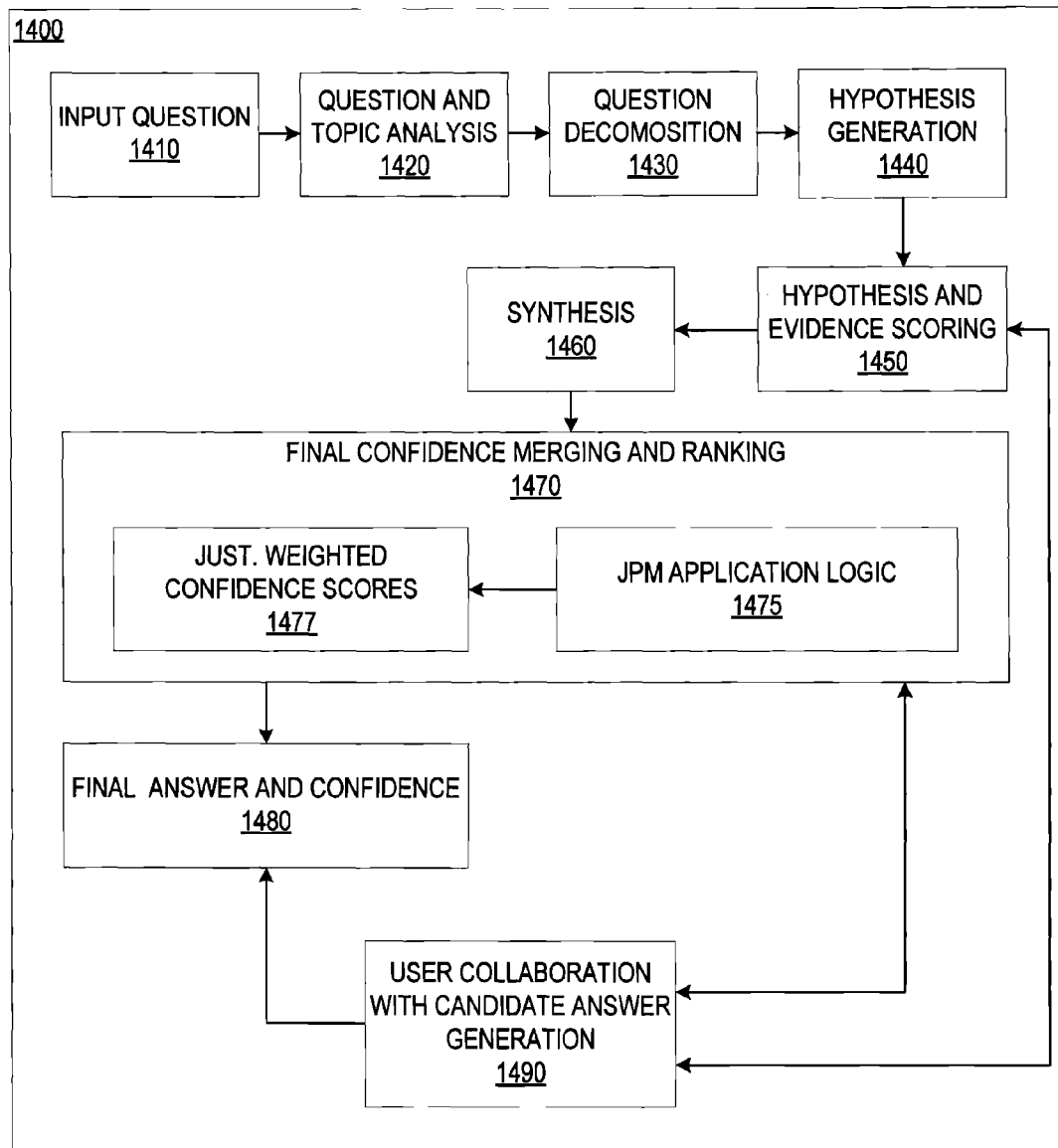
FIG. 14 is a diagram illustrating an operation for applying a justifying passage model to final confidence scores and ranking of candidate answers in accordance with one illustrative embodiment.

FIG. 14 is a diagram illustrating an operation for applying a justifying passage model to final confidence scores and ranking of candidate answers in accordance with one illustrative embodiment. As shown in FIG. 14, the operation of the QA system pipeline with regard to stages 1410-1460 is essentially the same as previously described above in conjunction with the similar stages in pipeline 500 of FIG. 5. In stage 1470, however, additional JPM application logic 1475 is provided for adjusting the candidate score values generated for the various candidate answers based on the evidence scoring performing during stage 1450, using the JPM to provide weightings to the confidence scores based on a determination relevancy of the underlying evidence passages. For example, the JPM application logic 1475 may, for a particular Q-A-P triplet, determine whether the corresponding evidence passage is justifying or not justifying of the answer being a correct answer for the particular input question. In so doing, the JPM application logic 1475 is essentially determining, based on previous training of the JPM, whether the particular evidence passage is relevant to the input question and thus, is justifying the candidate answer being a correct answer for the input question.

The evaluation by the JPM application logic 1475 as to whether the evidence passage is justifying of the candidate answer or not may be performed, for example, by performing a lookup operation of an evidence passage identifier, Q-A-P identifiers, or other uniquely identifying information, in a JPM ground truth data structure identifying whether evidence passages are justifying or not of the candidate answer for the particular question. If the evidence passage is determined to be justifying of the candidate answer being a correct answer for the input question, then the weight applied to the candidate answer's confidence score may be a first value, such as a heavier weighted value than a weight for evidence passages that are determined to be not justifying. Such weightings can be applied for each evidence passage considered when generating the candidate answer's confidence score. Thus, some evidence passages may be considered justifying of the candidate answer while others may not be justifying such that the justifying evidence passages' components of the confidence score are weighted more highly than the non justifying evidence passages' components of the confidence score.

The resulting justification weighted confidence scores 1477 may be used to perform the final ranking by the final confidence merging and ranking stage 1470 of the QA system pipeline 1400. From this, the final answer and confidence 1480 are generated and output in a manner as previously discussed above, such as in conjunction with stage 580 in FIG. 5, for example. Thus, with this illustrative embodiment, the information in the JPM obtained through training of the JPM and input from SMEs indicative of the relatedness of the evidence passage to the input question, is used to improve the scoring of candidate answers in the QA system pipeline 1400. The underlying logic behind this being that evidence passages that are highly related to the input question generate candidate answers that have a higher probability of being correct versus candidate answers obtained from evidence passages that are not highly related to the input question. Hence, candidate answers generated from evidence passages that are highly justifying of the answer with regard to the particular input question increase the confidence score associated with the candidate answer.

Thus, with the mechanisms of the illustrative embodiments, the relatedness of evidence passages to the input question may be quantified using a trained statistical machine learning model, i.e. the justifying passage model (JPM), such that the relatedness may be used to filter out evidence passages that are not sufficiently related and/or modify the confidence scores associated with the candidate answers corresponding to the evidence passages. It should be appreciated that while FIGS. 13 and 14 are shown and described above as separate embodiments, in other illustrative embodiments, the logic and operation of FIGS. 13 and 14 may be combined such that a combination of filtering and candidate answer scoring based on the JPM logic may be implemented.

In other illustrative embodiments, either alone or in combination with one or more of the logic elements and/or functionally described above with regard to FIGS. 13 and 14, mechanisms are provided for performing supporting passage retrieval to attempt to boost the confidence in the final answer output by the QA system. In these other illustrative embodiments, the context independent score of an candidate answer, as determined using the weight values of a trained JPM trained using the JPM ground truth data structure, is used as part of the candidate answer filtration to determine if a candidate answer should continue on to more resource intensive operations of the QA system pipeline including additional evidence passage retrieval and context dependent scoring. The purpose of this candidate answer filtering is to allow only high quality candidate answers to be passed on to the more expensive (in terms of processing cycles) stages of hypothesis and evidence scoring and later stages of the QA system pipeline, such as final ranking and scoring.

That is, during the hypothesis and evidence scoring stage, additional evidence passages, other than the ones identified by the original search of the corpus by the application of the queries generated from the decomposition of the input question, may be retrieved to determine a final confidence score associated with the candidate answer by generating the confidence score based on the originally identified evidence passages and then modifying the confidence score by further taking into consideration the scores associated with additional evidence passages. This process takes a relatively large amount of processing resources and processing time.

Thus, it is beneficial to restrict the expenditure of these resources and time on candidate answers that have relatively higher quality than others. With the mechanisms of the illustrative embodiments, this determination of which candidate answers should undergo such processing is first determined based on the context independent scores of the candidate answers identified through the application of the queries to the corpus and the use of context independent scoring on the candidate answers generated to thereby generate these context independent scores. The idea behind this being that candidate answers that context independent scoring algorithms identify as having a high confidence score, or "good" answers, that also come from evidence passages that are considered highly relevant, or "good" answers, as determined from the weights of the JPM applied to the context independent scores, are high quality candidate answers. By limiting the investment of processing resources to only those candidate answers that are determined to be of high quality based on the context independent scoring of the candidate answer and the relevance of the evidence passages as identified by the weighting, the efficiency of the QA system pipeline is improved by avoiding wasting resources on candidate answers that are not likely to result in a highly ranked candidate answer.

It should be appreciated that a context dependent scoring algorithm, or scorer, analyzes the overlap of the question and passage with the candidate answer/focus as the key item of overlap. The context independent scorer looks at the candidate answer to determine if context independent characteristics of the candidate answer match expected characteristics of a correct answer to the input question. For example, context independent scorers generate scores for candidate answers without considering the evidence passage from which the candidate answer was generated. Such context independent scorers operate attempting to determine if the candidate answer type (e.g., George Washington is a Person) matches the answer type that the input question implied (e.g., the question was asking for a person). If there is a match, then the context independent score is higher than if there is no match. Multiple different characteristics of the candidate answer and the expected characteristics of the correct answer as determined from an analysis of the input question may be considered by context independent scoring algorithms to determine the context independent score.

Figure 15:
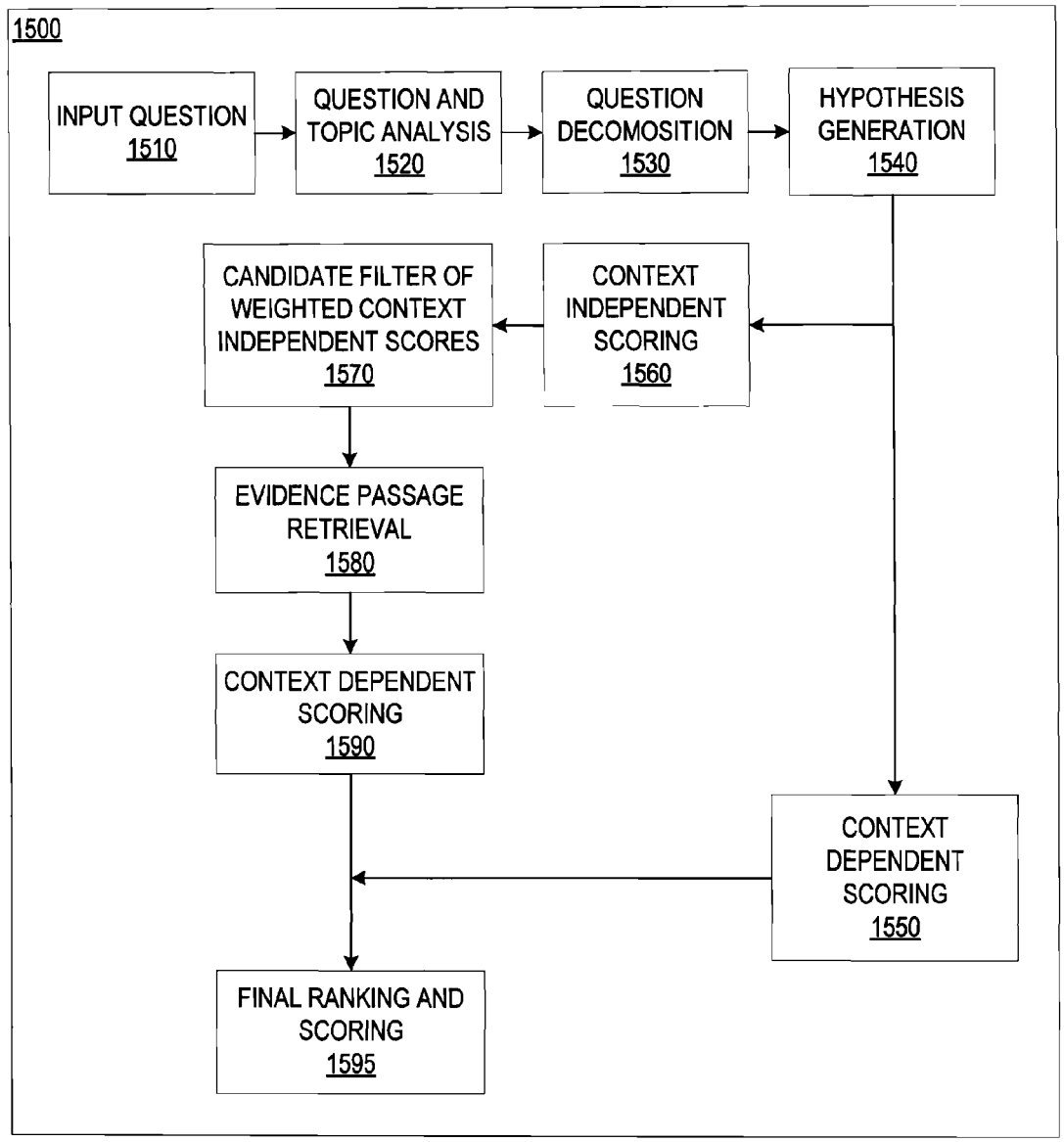
FIG. 15 is a diagram illustrating an operation for performing supporting passage retrieval for candidate answers in accordance with one illustrative embodiment.

FIG. 15 is a diagram illustrating an operation for performing supporting passage retrieval for candidate answers in accordance with one illustrative embodiment. As shown in FIG. 15, the QA system pipeline 1500 comprises similar QA system pipeline stages 1510-1540 to stages 510-540 of FIG. 5 in which an input question is received, parsed and characteristics identified, queries generated and applied to a corpus, and candidate answers and corresponding evidence passages are generated. At this point parallel operations may be implemented for performing context dependent scoring on the evidence passages and corresponding returned candidate answers and performing context independent scoring of the evidence passages. The context dependent scoring 1550 may follow the hypothesis and evidence scoring and synthesis operations outlined above with regard to stages 550 and 560 in FIG. 5 and thus, may process each of the candidate answers generated at stage 1540, for example, thereby producing a set of confidence scores for the Q-A-P triplets.

The context independent scoring 1560 performs scoring of the candidate answers independent of the context of the evidence passages. After performing the context independent scoring in stage 1560, the JPM and JPM data structure may be used to determine a weighted context independent score for each of the candidate answer, where the weights are specified in the JPM from the training based on relevance scores as previously described above. That is, the context independent score generated by one or more context independent scoring algorithms applied, during stage 1560, to the candidate answers generated by the hypothesis generation stage 1540 may be modified by applying a weighting factor to the context independent score in accordance with the JPM and JPM ground truth data structure. Thus, for example if it was determined from training of the JPM using the JPM ground truth data structure that an evidence passage that is the source of a candidate answer is justifying of the candidate answer for the particular question, then the context independent score is applied a higher weight than a candidate answer whose source evidence passage is not justifying of the candidate answer.

Based on the weighted context independent scores for the candidate answers, the set of candidate answers are filtered, in stage 1570, according to one or more filter criteria to generate a reduced set of candidate answers. The reduced set of candidate answers are then subjected to additional processing to perform supporting passage retrieve 1580 for finding additional evidence passages in the corpus that support the candidate answer being a correct answer for the input question and performing context dependent scoring 1590 in a manner similar to the operation of the QA system pipeline as discussed above. The resulting context dependent scores generated by the two parallel operations are input to the final ranking and scoring stage 1595 to generate the final answer and/or ranked listing of candidate answers. In stage 1595 essentially the candidate answer providing the best confidence score is selected as a final answer, where the candidate answer may come from the set evaluated through either straight context dependent scoring of the candidate answers directly from the hypothesis generation stage 1540, or context independent scoring 1560 followed by filtering of candidate answers to identify the most likely candidate answers to generate good results in step 1570, additional evidence passage retrieval 1580 and context dependent scoring 1590 based on the additional evidence passage retrieval for only those candidate answers passed through the filtering in stage 1570. The parallel path of stages 1560-1590 may "boost" the confidence in a candidate answer by looking for additional supporting evidence while only doing so for only those candidate answers determined to be most relevant to the input question through context independent scoring so as to minimize the expenditure of time and resource intensive operations for finding additional supporting evidence passages, performing context dependent scoring on them, and evaluating them to determine a final answer to an input question.

It should be appreciated that while the above illustrative embodiments are described in terms of an evidence passage being determined to either be justifying or not justifying of a candidate answer being a correct answer for a particular input question, the illustrative embodiments are not limited to these embodiments. To the contrary, a spectrum of values indicative of justifying or not justifying evidence passages may be utilized such that varying levels of justification are enabled. Hence an evidence passage may be determined to be "highly justifying" while other evidence passages may be determined to be "somewhat justifying", others "minimally justifying", and still others "not-justifying." As such, various weighting values may be assigned to various levels of justification of the particular evidence passage.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory configured to implement a question and answer system (QA), for generating answers to an input question, comprising:
    training a justifying passage model (JPM) based on a JPM ground truth data structure that comprises a justification indicator for each question-answer-evidence passage (QAP) triplet in a plurality of QAP triplets of the JPM ground truth data structure, wherein the justification indicator indicates whether or not an answer in the QAP triplet is justified by the evidence passage of the QAP triplet as being a correct answer for a question in the QAP triplet, and wherein an answer of the QAP triplet is justified by the evidence passage of the QAP triplet when content of the evidence passage explicitly states the answer to be a correct answer for the question of the QAP triplet;
    receiving, in the data processing system, the input question;
    generating, by the data processing system, a set of candidate answers for the input question and, for each candidate answer in the set of candidate answers, a corresponding selection of one or more selected evidence portions from a corpus of information providing evidence in support of the candidate answer being a correct answer for the input question;
    ranking, by the data processing system, the candidate answers based on an application of the trained JPM to the selected evidence portions for each of the candidate answers in the set of candidate answers, wherein the JPM identifies whether a candidate answer is justified by a selected evidence portion corresponding to the candidate answer, and wherein application of the trained JPM to the selected evidence portions causes the ranking of the candidate answers to be modified based on whether or not a selected evidence portion is justifying of a corresponding candidate answer; and
    outputting, by the data processing system, a candidate answer in the set of candidate answers as the correct answer for the input question based on the ranking of the candidate answers.

2. The method of claim 1, wherein the justification indicator for each QAP triplet in the plurality of QAP triplets is set to a justification value by a subject matter expert that evaluates the QAP triplet.

3. The method of claim 1, wherein application of the JPM to the selected evidence portions comprises applying one or more weights of the JPM to evidence scores associated with the selected evidence portions to thereby generate a confidence score associated with the candidate answer, wherein the one or more weights of the JPM indicate a degree of relevance of the selected evidence portions to the input question.

4. The method of claim 1, wherein application of the JPM to the selected evidence portions comprises:
    ranking evidence portions in the selected evidence portions according to evidence scores generated based on the application of the JPM to the selected evidence portions; and
    selecting a subset of the ranked evidence portions in the selected evidence portions, for use in ranking the candidate answers, based on one or more filter criteria.

5. The method of claim 1, wherein application of the JPM to the selected evidence portions comprises, for each candidate answer in the set of candidate answers:
    weighting an evidence score associated with an evidence portion associated with the candidate answer based on a weight value, in the JPM, associated with the evidence portion; and
    calculating a weighted confidence score for the candidate answer based on a combination of weighted evidence scores for evidence portions associated with the candidate answer.

6. The method of claim 1, wherein application of the JPM to the selected evidence portions comprises, for each candidate answer:
    performing first context dependent scoring of the evidence portions corresponding to the candidate answer, wherein the first context dependent scoring scores the candidate answer based on a correlation between the candidate answer and the evidence portions corresponding to the candidate answer; and
    performing context independent scoring of the candidate answer, wherein the context independent scoring of the candidate answer scores the candidate answer independently of the evidence portions corresponding to the candidate answer.

7. The method of claim 6, wherein application of the JPM to the selected evidence portions comprises:
    weighting, based on the JPM, context independent scores associated with the candidate answers to generate weighted context independent scores;
    filtering, based on the weighted context independent scores of the candidate answers, candidate answers from the set of candidate answers to generate a subset of candidate answers; and performing, for each candidate answer in the subset of candidate answers, additional evidence portion retrieval operations for retrieving additional evidence portions from the corpus that support the candidate answer as being a correct answer for the input question.

8. The method of claim 7, wherein application of the JPM to the selected evidence portions further comprises:
performing second context dependent scoring on the additional evidence portions retrieved as a result of the additional evidence portion retrieval operations;
combining results of the first context dependent scoring and the second context dependent scoring; and
generating a final ranking of candidate answers based on the combined results of the first context dependent scoring and the second context dependent scoring.

9. The method of claim 6, wherein performing the first context dependent scoring and performing the context independent scoring are performed in parallel by parallel QA system pipeline paths on candidate answers generated by the QA system pipeline.

10. A computer program product comprising a computer readable storage medium having a computer readable program stored therein, wherein the computer readable program, when executed on a data processing system implementing a question and answer system (QA), causes the data processing system to:
train a justifying passage model (JPM) based on a JPM ground truth data structure that comprises a justification indicator for each question-answer-evidence passage (QAP) triplet in a plurality of QAP triplets of the JPM ground truth data structure, wherein the justification indicator indicates whether or not an answer in the QAP triplet is justified by the evidence passage of the QAP triplet as being a correct answer for a question in the QAP triplet, and wherein an answer of the QAP triplet is justified by the evidence passage of the QAP triplet when content of the evidence passage explicitly states the answer to be a correct answer for the question of the QAP triplet;
receive the input question;
generate a set of candidate answers for the input question and, for each candidate answer in the set of candidate answers, a corresponding selection of one or more selected evidence portions from a corpus of information providing evidence in support of the candidate answer being a correct answer for the input question;
rank the candidate answers based on an application of the trained JPM to the selected evidence portions for each of the candidate answers in the set of candidate answers, wherein the JPM identifies whether a candidate answer is justified by a selected evidence portion corresponding to the candidate answer, and wherein application of the trained JPM to the selected evidence portions causes the ranking of the candidate answers to be modified based on whether or not a selected evidence portion is justifying of a corresponding candidate answer; and
output a candidate answer in the set of candidate answers as the correct answer for the input question based on the ranking of the candidate answers.

11. The computer program product of claim 10, wherein the justification indicator for each QAP triplet in the plurality of QAP triplets is set to a justification value by a subject matter expert that evaluates the QAP triplet.

12. The computer program product of claim 10, wherein the computer readable program further causes the data processing system to apply the JPM to the selected evidence portions at least by applying one or more weights of the JPM to evidence scores associated with the selected evidence portions to thereby generate a confidence score associated with the candidate answer, wherein the one or more weights of the JPM indicate a degree of relevance of the selected evidence portions to the input question.

13. The computer program product of claim 10, wherein the computer readable program further causes the data processing system to apply the JPM to the selected evidence portions at least by:
ranking evidence portions in the selected evidence portions according to evidence scores generated based on the application of the JPM to the selected evidence portions; and
selecting a subset of the ranked evidence portions in the selected evidence portions, for use in ranking the candidate answers, based on one or more filter criteria.

14. The computer program product of claim 10, wherein the computer readable program further causes the data processing system to apply the JPM to the selected evidence portions at least by, for each candidate answer in the set of candidate answers:
weighting an evidence score associated with an evidence portion associated with the candidate answer based on a weight value, in the JPM, associated with the evidence portion; and
calculating a weighted confidence score for the candidate answer based on a combination of weighted evidence scores for evidence portions associated with the candidate answer.

15. The computer program product of claim 10, wherein the computer readable program further causes the data processing system to apply the JPM to the selected evidence portions at least by, for each candidate answer:
performing first context dependent scoring of the evidence portions corresponding to the candidate answer, wherein the first context dependent scoring scores the candidate answer based on a correlation between the candidate answer and the evidence portions corresponding to the candidate answer; and
performing context independent scoring of the candidate answer, wherein the context independent scoring of the candidate answer scores the candidate answer independently of the evidence portions corresponding to the candidate answer.

16. The computer program product of claim 15, wherein the computer readable program further causes the data processing system to apply the JPM to the selected evidence portions at least by:
weighting, based on the JPM, context independent scores associated with the candidate answers to generate weighted context independent scores;
filtering, based on the weighted context independent scores of the candidate answers, candidate answers from the set of candidate answers to generate a subset of candidate answers; and
performing, for each candidate answer in the subset of candidate answers, additional evidence portion retrieval operations for retrieving additional evidence portions from the corpus that support the candidate answer as being a correct answer for the input question.

17. The computer program product of claim 16, wherein the computer readable program further causes the data processing system to apply the JPM to the selected evidence portions further at least by:

performing second context dependent scoring on the additional evidence portions retrieved as a result of the additional evidence portion retrieval operations;

combining results of the first context dependent scoring and the second context dependent scoring; and generating a final ranking of candidate answers based on the combined results of the first context dependent scoring and the second context dependent scoring.

18. A data processing system configured to implement a question and answer system (QA), comprising:

a processor; and a memory coupled to the processor, wherein the memory comprises instructions which, when executed by the processor, cause the processor to:

train a justifying passage model (JPM) based on a JPM ground truth data structure that comprises a justification indicator for each question-answer-evidence passage (QAP) triplet in a plurality of QAP triplets of the JPM ground truth data structure, wherein the justification indicator indicates whether or not an answer in the QAP triplet is justified by the evidence passage of the QAP triplet as being a correct answer for a question in the QAP triplet, and wherein an answer of the QAP triplet is justified by the evidence passage of the QAP triplet when content of the evidence passage explicitly states the answer to be a correct answer for the question of the QAP triplet;

receive the input question;

generate a set of candidate answers for the input question and, for each candidate answer in the set of candidate answers, a corresponding selection of one or more selected evidence portions from a corpus of information providing evidence in support of the candidate answer being a correct answer for the input question;

rank the candidate answers based on an application of the trained JPM to the selected evidence portions for each of the candidate answers in the set of candidate answers, wherein the JPM identifies whether a candidate answer is justified by a selected evidence portion corresponding to the candidate answer, and wherein application of the trained JPM to the selected evidence portions causes the ranking of the candidate answers to be modified based on whether or not a selected evidence portion is justifying of a corresponding candidate answer; and output a candidate answer in the set of candidate answers as the correct answer for the input question based on the ranking of the candidate answers.

19. A method, in a data processing system comprising a processor and a memory configured to implement a question and answer system (QA), for generating answers to an input question, comprising:

receiving, in the data processing system, the input question;

generating, by the data processing system, a set of candidate answers for the input question and, for each candidate answer in the set of candidate answers, a corresponding selection of one or more selected evidence portions from a corpus of information providing evidence in support of the candidate answer being a correct answer for the input question;

for each candidate answer in the set of candidate answers:

applying a justifying passage model (JPM) to selected evidence portions associated with the candidate answer to generate an evidence score for each selected evidence portion, wherein the JPM identifies whether a candidate answer is justified by a selected evidence passage corresponding to the candidate answer and modifies the evidence score according to whether or not the candidate answer is justified by the selected evidence passage, and wherein the candidate answer is justified by the selected evidence portion when content of the selected evidence portion explicitly states the candidate answer to be a correct answer for the input question;

selecting a subset of the selected evidence portions for use in ranking the candidate answers, based on one or more filter criteria; and ranking the candidate answer relative to other candidate answers in the set of candidate answers based on the selected subset of the ranked evidence portions; and outputting, by the data processing system, a candidate answer in the set of candidate answers as the correct answer for the input question based on the ranking of the candidate answers.

20. The method of claim 1, wherein ranking the candidate answers based on the application of the trained JPM to the selected evidence portions for each of the candidate answers comprises, for each candidate answer:

applying the justifying passage model (JPM) to each selected evidence portion associated with the candidate answer to generate an evidence score for each selected evidence portion, wherein the JPM identifies whether the candidate answer is justified by the selected evidence portion and modifies the evidence score of the selected evidence portion according to whether or not the candidate answer is justified by the selected evidence portion; and generating a ranked listing of the selected evidence portions for the candidate answer by ranking the selected evidence portions according to evidence scores associated with each of the selected evidence portions; and selecting a subset of the selected evidence portions for use in ranking the candidate answers, by applying one or more filter criteria to the ranked listing of selected evidence portions.

21. The computer program product of claim 10, wherein ranking the candidate answers based on the application of the trained JPM to the selected evidence portions for each of the candidate answers comprises, for each candidate answer:

applying the justifying passage model (JPM) to each selected evidence portion associated with the candidate answer to generate an evidence score for each selected evidence portion, wherein the JPM identifies whether the candidate answer is justified by the selected evidence portion and modifies the evidence score of the selected evidence portion according to whether or not the candidate answer is justified by the selected evidence portion; and generating a ranked listing of the selected evidence portions for the candidate answer by ranking the selected evidence portions according to evidence scores associated with each of the selected evidence portions; and selecting a subset of the selected evidence portions for use in ranking the candidate answers, by applying one or more filter criteria to the ranked listing of selected evidence portions.

* * * * *